(12) United States Patent
Murayama et al.

(10) Patent No.: US 10,556,635 B2
(45) Date of Patent: Feb. 11, 2020

(54) STRADDLED VEHICLE

(71) Applicant: YAMAHA HATSUDOKI KABUSHIKI KAISHA, Iwata-shi, Shizuoka-ken (JP)

(72) Inventors: Yuki Murayama, Iwata (JP); Katsuya Haruta, Iwata (JP)

(73) Assignee: YAMAHA HATSUDOKI KABUSHIKI KAISHA, Iwata-Shi, Shizuoka-Ken (JP)

(*) Notice: Subject to any disclaimer, the term of this patent is extended or adjusted under 35 U.S.C. 154(b) by 164 days.

(21) Appl. No.: 15/677,147

(22) Filed: Aug. 15, 2017

(65) Prior Publication Data

US 2018/0148117 A1    May 31, 2018

(30) Foreign Application Priority Data

Nov. 28, 2016  (JP) .................................. 2016-230671

(51) Int. Cl.
  *B62J 35/00* (2006.01)
  *B62K 11/04* (2006.01)
  *B62J 17/00* (2006.01)

(52) U.S. Cl.
  CPC ............... *B62J 35/00* (2013.01); *B62K 11/04* (2013.01); *B62J 17/00* (2013.01)

(58) Field of Classification Search
  CPC .................................. B62J 35/00; B62K 11/04
  See application file for complete search history.

(56) References Cited

U.S. PATENT DOCUMENTS

| | | | | |
|---|---|---|---|---|
| 3,987,294 A | * | 10/1976 | Carlson | B62J 6/00 362/101 |
| 4,449,723 A | * | 5/1984 | Shiratsuchi | B62J 35/00 180/219 |
| 4,694,924 A | * | 9/1987 | Asakura | B62J 1/12 180/229 |
| 5,944,216 A | * | 8/1999 | Inaoka | B60K 15/03 220/4.14 |
| 6,237,710 B1 | * | 5/2001 | Mori | B62H 5/00 180/219 |
| 6,641,169 B2 | * | 11/2003 | Fukunaga | B62J 35/00 224/413 |
| 7,410,191 B2 | * | 8/2008 | Karube | B62K 5/01 180/219 |
| 7,422,243 B2 | * | 9/2008 | Kudo | F02B 61/02 123/509 |
| 7,455,052 B2 | * | 11/2008 | Yagisawa | B62J 35/00 123/509 |

(Continued)

FOREIGN PATENT DOCUMENTS

JP      2005-47403 A      2/2005

*Primary Examiner* — Kevin Hurley
*Assistant Examiner* — Michael R Stabley
(74) *Attorney, Agent, or Firm* — Rabin & Berdo, P.C.

(57) ABSTRACT

A straddled vehicle includes a main frame extending rearward from a head pipe in a vehicle front-rear direction; a rubber bracket attached to the main frame and formed in a recessed shape that is open upward; and a protruding member extending sideways from a side wall of a fuel tank, wherein the protruding member engages with the rubber bracket. A portion of the fuel tank overlaps with a rear cross frame as the vehicle is seen from above.

20 Claims, 17 Drawing Sheets

(56) References Cited

U.S. PATENT DOCUMENTS

| | | | |
|---|---|---|---|
| 7,690,689 B2* | 4/2010 | Muroo | B62J 35/00 280/833 |
| 7,992,901 B2* | 8/2011 | Hirano | B62J 35/00 280/833 |
| 8,662,518 B2* | 3/2014 | Koike | B62J 35/00 280/288.4 |
| 9,193,259 B2* | 11/2015 | Yokomura | B62J 35/00 |
| 9,334,006 B2* | 5/2016 | Tamura | B62J 35/00 |
| 2005/0029032 A1* | 2/2005 | Kudo | B62M 7/00 180/219 |
| 2011/0204613 A1* | 8/2011 | Aoki | B62J 35/00 280/830 |
| 2015/0061276 A1* | 3/2015 | Nishida | B62J 35/00 280/835 |

* cited by examiner

STRADDLED VEHICLE

CROSS-REFERENCE TO RELATED APPLICATIONS

This application claims the benefit of priority to Japanese Patent Application No. 2016-230671 filed on Nov. 28, 2016. The entire contents of this application are hereby incorporated herein by reference.

BACKGROUND OF THE INVENTION

Field of the Invention

The present invention relates to a straddled vehicle.

Description of the Related Art

A motorcycle has been known in the art, in which a part of the fuel tank is not fastened to the vehicle body frame via a bolt, but is rather supported by means of an engaging structure. One such motorcycle is described in Japanese Laid-Open Patent Publication No. 2005-47403, for example.

A motorcycle described in Japanese Laid-Open Patent Publication No. 2005-47403 includes a fuel tank with a left and a right inner wall that is formed by recessing upward the central portion of the bottom surface. An engagement member having a recessed shape that is open in the forward direction is attached to the left and right inner walls. Projections that project outward in the vehicle width direction are provided on the vehicle body frame.

When installing a fuel tank, the engagement members of the fuel tank are first positioned rearward of the projections on the vehicle body frame. Then, the fuel tank is moved forward, thereby engaging the engagement members with the projections. Then, the rear portion of the fuel tank is secured to the support plate of the vehicle body frame via a bolt. Thus, the fuel tank is supported on the vehicle body frame.

With the motorcycle described above, no bolt is needed to secure the front portion of the fuel tank to the vehicle body frame. Therefore, the number of parts can be reduced. Also, there is no need for the operation of fastening a bolt, and it is easy to install the fuel tank on the vehicle body frame.

With the motorcycle described above, however, one needs to first position the engagement members of the fuel tank rearward of the projections of the vehicle body frame, and then slide the fuel tank forward. Therefore, extra space needs to be reserved in advance rearward of the installed fuel tank. This has resulted in dead space. This space has inhibited the downsizing of the motorcycle.

SUMMARY OF THE INVENTION

It is an object of the present invention, which has been made in order to solve the problem, to provide a straddled vehicle, with which it is possible to reduce the number of parts used for securing a portion of the fuel tank to the vehicle body frame, with which it is easy to install the fuel tank, and with which there is no dead space rearward of the fuel tank.

A straddled vehicle according to the present invention includes a vehicle body frame including a head pipe, and a main frame extending rearward from the head pipe in a vehicle front-rear direction. The straddled vehicle includes: a fuel tank including a side wall; a rubber bracket attached to the main frame and having side walls that define a recess that is open upward; a protruding member extending sideways from the side wall of the fuel tank, wherein the protruding member engages with the rubber bracket; and a rear cross frame located rearward of the rubber bracket in the vehicle front-rear direction and extending sideways from the main frame. A portion of the fuel tank overlaps with the rear cross frame as the vehicle is seen from above.

With the straddled vehicle set forth above, the protruding member extending sideways from the side wall of the fuel tank engages with the rubber bracket attached to the main frame, thus supporting the fuel tank on the main frame. Since there is no need for a bolt, or the like, it is possible to reduce the number of parts and it is easy to install the fuel tank. Moreover, since the rubber bracket is formed in a recessed shape that is open upward, the protruding member can be engaged with the rubber bracket simply by moving the fuel tank downward, thus pressing down the protruding member from above onto the rubber bracket. Since there is no need to slide the fuel tank forward, there is no need to reserve extra space rearward of the installed fuel tank. Since there is no need to reserve extra space, the fuel tank can be located so that a portion of the fuel tank overlaps with the rear cross frame as the vehicle is seen from above, and it is therefore possible to save space rearward of the fuel tank.

According to a preferred embodiment of the present invention, the rubber bracket includes a supporting portion that supports the protruding member, and front and rear barb portions located above the supporting portion and located so that an interval therebetween is narrower than side walls of the rubber bracket below the front and rear barb portions.

According to the embodiment set forth above, it is possible to more reliably prevent the protruding member from coming off the rubber bracket. Therefore, the fuel tank can be supported stably on the main frame.

According to another preferred embodiment of the present invention, the rubber bracket is fastened to the main frame via a bolt.

According to the embodiment set forth above, the rubber bracket can be secured stably on the main frames. Therefore, the fuel tank can be supported stably on the main frame.

According to another preferred embodiment of the present invention, the protruding member is formed integrally with the fuel tank.

According to the embodiment set forth above, the protruding member will not rattle with respect to the fuel tank. Therefore, the fuel tank can be supported stably on the main frame.

According to another preferred embodiment of the present invention, the protruding member extends outward in a vehicle width direction.

According to the embodiment set forth above, the protruding member and the rubber bracket are located inward of the main frame in the vehicle width direction. It is possible to realize the advantageous effects set forth above while reducing the dimension in the vehicle width direction.

Another straddled vehicle according to the present invention includes a vehicle body frame including a head pipe, and a main frame extending rearward from the head pipe in a vehicle front-rear direction. The straddled vehicle includes: a fuel tank including a side wall; a protruding member extending sideways from the main frame; a rubber bracket attached to the side wall of the fuel tank and having side walls that define a recess that is open downward; and a rear cross frame located rearward of the protruding member in the vehicle front-rear direction and extending sideways from the main frame. A portion of the fuel tank overlaps with the rear cross frame as the vehicle is seen from above.

With the straddled vehicle set forth above, the protruding member extending sideways from the main frame engages with the rubber bracket attached to the side wall of the fuel tank, thus supporting the fuel tank on the main frame. Since there is no need for a bolt, or the like, it is possible to reduce the number of parts and it is easy to install the fuel tank. Moreover, since the rubber bracket is formed in a recessed shape that is open downward, the rubber bracket can be engaged with the protruding member simply by moving the fuel tank downward, thus pressing down the rubber bracket from above onto the protruding member. Since there is no need to slide the fuel tank forward, there is no need to reserve extra space rearward of the installed fuel tank. Since there is no need to reserve extra space, the fuel tank can be located so that a portion of the fuel tank overlaps with the rear cross frame as the vehicle is seen from above, and it is therefore possible to save space rearward of the fuel tank.

According to another preferred embodiment of the present invention, the rubber bracket includes a supported portion that is supported by the protruding member, and front and rear barb portions located below the supported portion and located so that an interval therebetween is narrower than an interval between side walls of the rubber bracket above the front and rear barb portions.

According to the embodiment set forth above, it is possible to more reliably prevent the protruding member from coming off the rubber bracket. Therefore, the fuel tank can be supported stably on the main frame.

According to another preferred embodiment of the present invention, the main frame and the rubber bracket overlap with each other as the vehicle is seen from the side.

According to the embodiment set forth above, it is possible to prevent the rubber bracket and the protruding member from protruding upward or downward from the main frame. When the rubber bracket and the protruding member protrude upward or downward from the main frame, there will be needed a separate cover for covering the rubber bracket and the protruding member from the side, but such a cover is not needed.

According to another preferred embodiment of the present invention, the straddled vehicle includes a seat located over the fuel tank, at least a portion of the seat being supported by the fuel tank.

According to the embodiment set forth above, the fuel tank can be pressed from above by the weight of the seat and the weight of the rider seated on the seat. Therefore, it is possible to reliably prevent the protruding member from coming off the rubber bracket, and the fuel tank can be supported stably on the main frame.

According to another preferred embodiment of the present invention, a front end of the seat is located forward of a middle position of the fuel tank in the vehicle front-rear direction.

According to the embodiment set forth above, the fuel tank can be desirably pressed from above by the seat and the rider on the seat, and the fuel tank can be supported stably on the main frame.

According to another preferred embodiment of the present invention, a front end of the seat is located forward of a front end of the fuel tank in the vehicle front-rear direction.

According to the embodiment set forth above, the fuel tank can be desirably pressed from above by the seat and the rider on the seat, and the fuel tank can be supported stably on the main frame.

According to another preferred embodiment of the present invention, the straddled vehicle includes a first vehicle part located forward of the fuel tank in the vehicle front-rear direction. A minimum interval between the fuel tank and the first vehicle part in the vehicle front-rear direction is smaller than a dimension of the rubber bracket in the vehicle front-rear direction.

According to the embodiment set forth above, since there is no need to slide the fuel tank rearward when installing the fuel tank, it is possible to reduce the interval between the fuel tank and the first vehicle part located forward of the fuel tank. Therefore, it is possible to avoid creating dead space forward of the fuel tank.

According to another preferred embodiment of the present invention, the first vehicle part is an air cleaner.

According to the embodiment set forth above, it is possible to avoid creating dead space between the fuel tank and the air cleaner.

According to another preferred embodiment of the present invention, the straddled vehicle includes a second vehicle part located rearward of the fuel tank in the vehicle front-rear direction. A minimum interval between the fuel tank and the second vehicle part in the vehicle front-rear direction is smaller than a dimension of the rubber bracket in the vehicle front-rear direction.

According to the embodiment set forth above, since there is no need to slide the fuel tank forward when installing the fuel tank, it is possible to reduce the interval between the fuel tank and the second vehicle part located rearward of the fuel tank. Therefore, it is possible to avoid creating dead space rearward of the fuel tank.

According to another preferred embodiment of the present invention, the second vehicle part is a battery.

According to the embodiment set forth above, it is possible to avoid creating dead space between the fuel tank and the battery.

According to another preferred embodiment of the present invention, the protruding member and the rubber bracket are located forward of a middle position of the fuel tank in the vehicle front-rear direction; and. The straddled vehicle includes a fastened portion provided in a portion of the fuel tank that is rearward of the middle position thereof in the vehicle front-rear direction, wherein the fastened portion is fastened to the vehicle body frame via a bolt.

According to the embodiment set forth above, the front portion of the fuel tank is supported on the main frame via the engagement between the protruding member and the rubber bracket, and the rear portion of the fuel tank is secured on the vehicle body frame via a bolt. The entirety of the fuel tank can be supported stably on the vehicle body frame while realizing the advantageous effects set forth above.

According to the present invention, it is possible to provide a straddled vehicle, with which it is possible to reduce the number of parts used for securing a portion of the fuel tank to the vehicle body frame, with which it is easy to install the fuel tank, and with which there is no dead space rearward of the fuel tank.

DETAILED DESCRIPTION OF THE PREFERRED EMBODIMENTS

Figure 1:
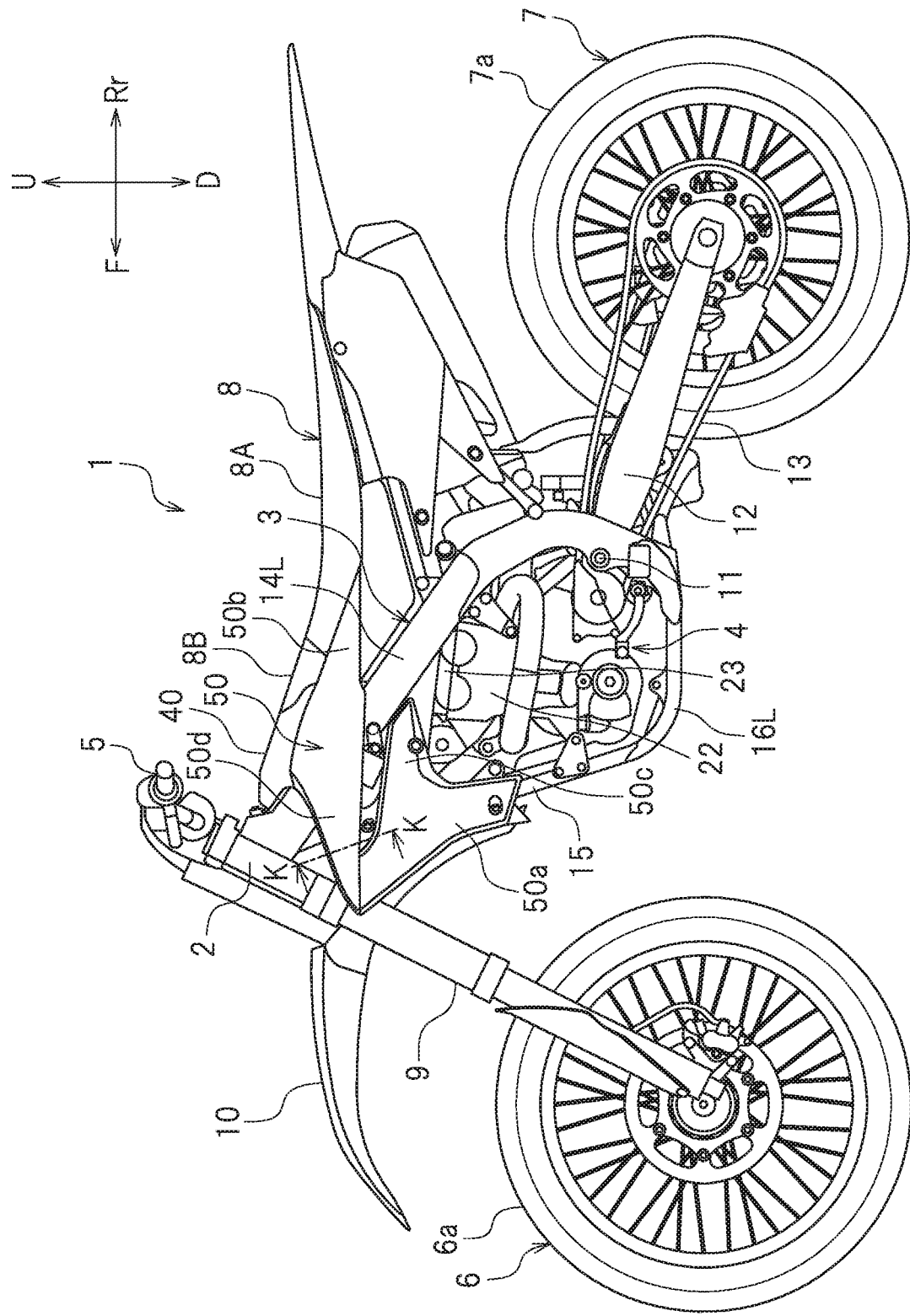
FIG. 1 is a side view of a motorcycle according to one embodiment.

An embodiment of the present invention will now be described with reference to the drawings. FIG. 1 is a side view of a motorcycle 1 according to the embodiment. The motorcycle 1 includes a vehicle body frame 3 including a head pipe 2, an engine unit 4, a handle 5, a front wheel 6, a rear wheel 7, and a seat 8 on which the rider is seated.

The terms front, rear, left, right, up and down, as used in the description below, refer to these directions as seen from the rider while assuming that the motorcycle 1 is standing upright on a horizontal surface with no load thereon. Note that "no load" means that there is no rider on the motorcycle 1 and the motorcycle 1 has no fuel. The designations F, Rr, L, R, U and D, as used in the figures, refer to front, rear, left, right, up and down, respectively.

The term "front" is not limited to the horizontal forward direction, but is inclusive of any inclined direction that is in the range of −45° to +45° with respect to the horizontal forward direction, unless specified otherwise. Similarly, the term "rear" is not limited to the horizontal rearward direction, but is inclusive of any inclined direction that is in the range of −45° to +45° with respect to the horizontal rearward direction. The term "left" is not limited to the leftward direction in the vehicle width direction, but is inclusive of any inclined direction that is in the range of −45° to +45° with respect to that direction. The term "right" is not limited to the rightward direction in the vehicle width direction, but is inclusive of any inclined direction that is in the range of −45° to +45° with respect to that direction. The term "up" is not limited to the vertical upward direction, but is inclusive of any inclined direction that is in the range of −45° to +45° with respect to the vertical upward direction. In the present specification and claims, the terms "up" and "upward" generally refer to the relationship of an object and the ground, or the surface on which the vehicle, such as the motorcycle, is resting with its wheels or tires on the ground or surface. In other words, the direction of the object relative to the ground or surface on which the tires are resting is generally up or upward. The term "down" is not limited to the vertical downward direction, but is inclusive of any inclined direction that is in the range of −45° to +45° with respect to the vertical downward direction. In the present specification and claims, the term "integral" means one object is formed or manufactured simultaneously with another, such that they are not formed separately and later connected by fasteners or welds, but rather they are formed together and merge seamlessly into each other.

A front portion of an object refers to a portion that is forward of the middle of the object in the vehicle front-rear direction, unless specified otherwise. A rear portion of an object refers to a portion that is rearward of the middle of the object in the vehicle front-rear direction.

A steering shaft (not shown) is supported on the head pipe 2 so that the steering shaft can rotate left and right. The handle 5 is secured on an upper portion of the steering shaft. A front fork 9 is secured on a lower portion of the steering shaft. The front wheel 6 including a tire 6a is supported on a lower portion of the front fork 9. A front fender 10 is located above the front wheel 6. A rear arm 12 is supported on the vehicle body frame 3 via a pivot shaft 11 so that the rear arm 12 can pivot up and down. The rear wheel 7 including a tire 7a is supported on a rear end portion of the rear arm 12. The engine unit 4 and the rear wheel 7 are linked together via a transmission member 13 such as a chain.

Figure 2:
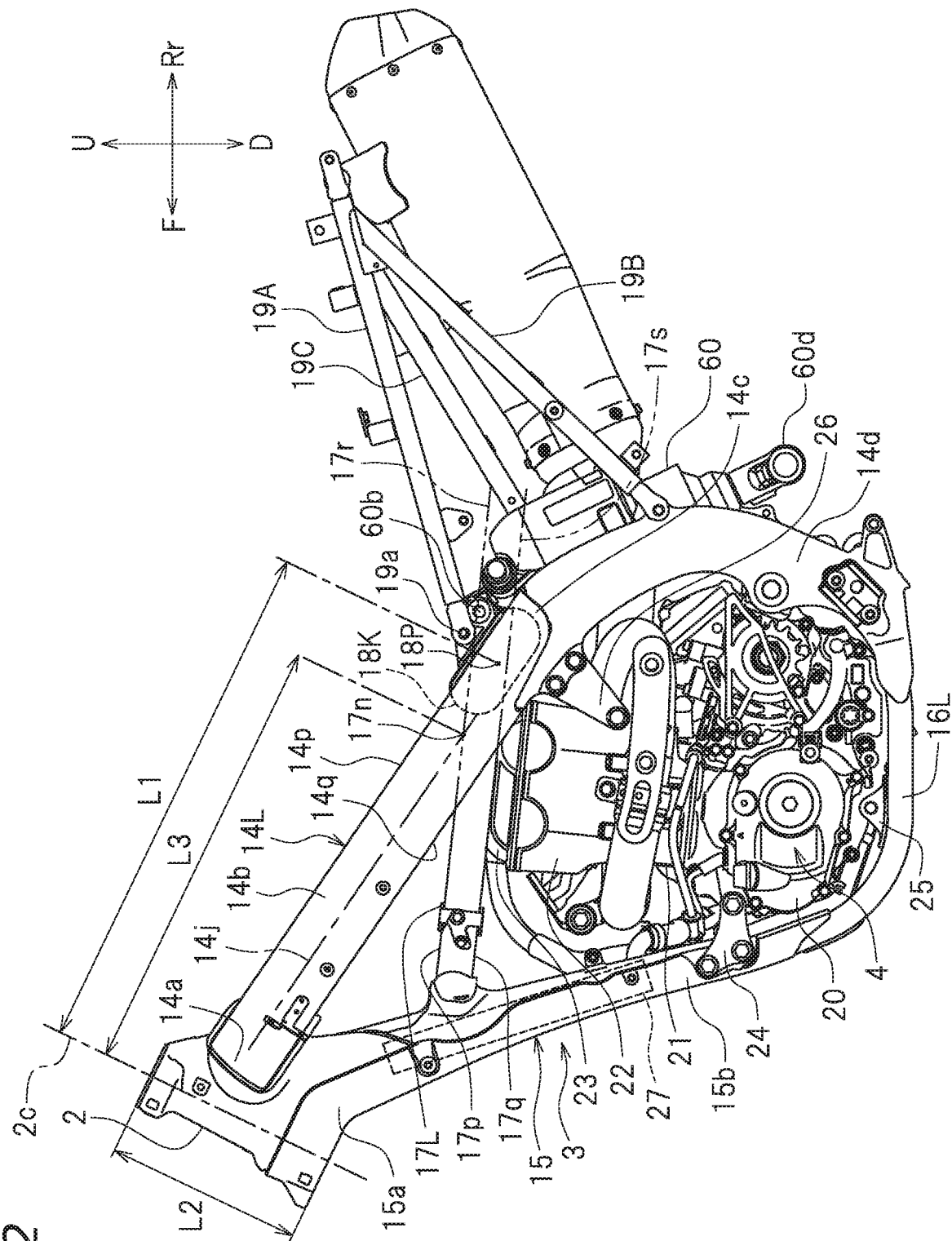
FIG. 2 is a side view of a portion of the motorcycle.
Figure 3:
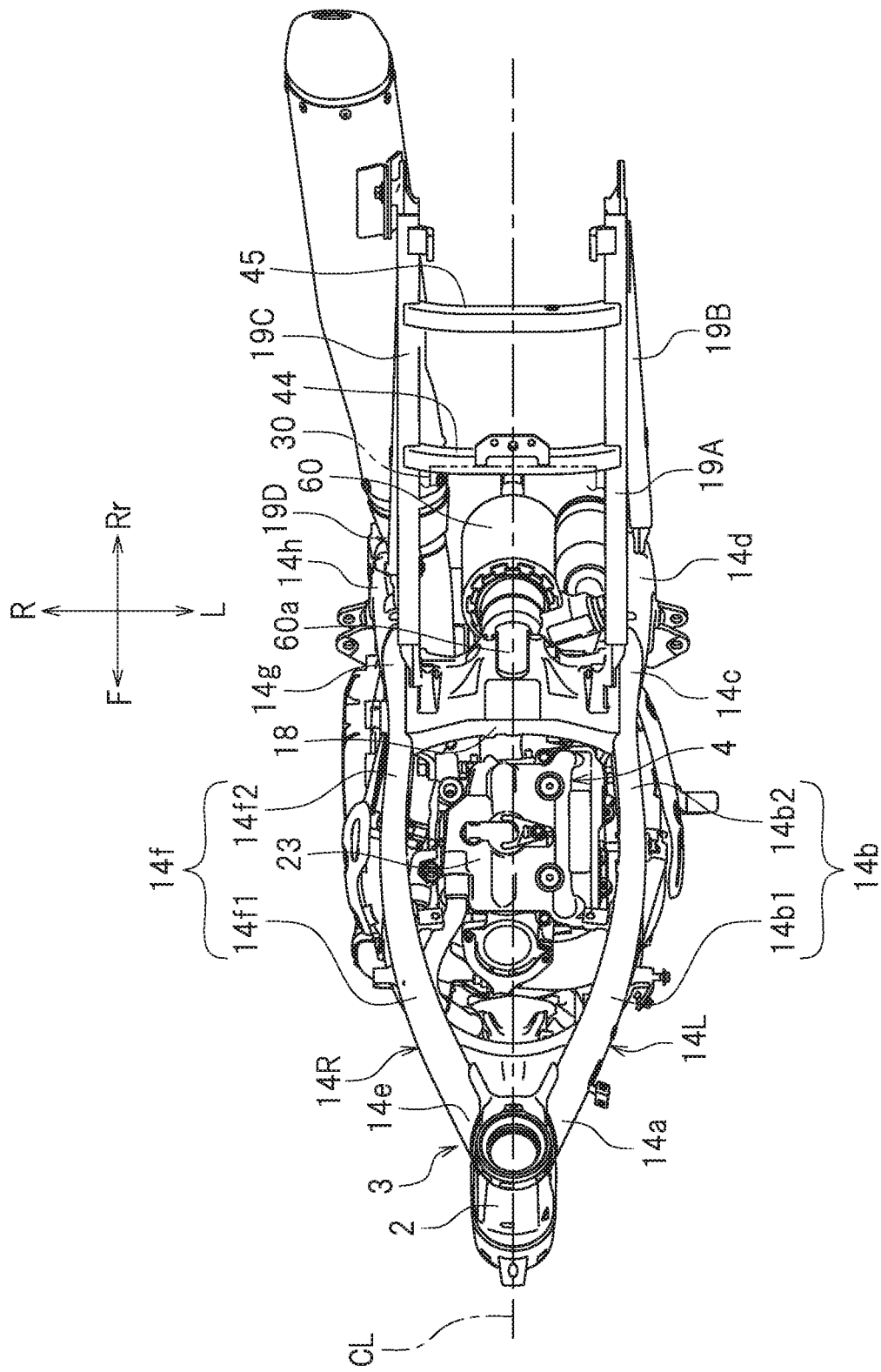
FIG. 3 is a plan view of a portion of the motorcycle.

FIG. 2 is a side view of a portion of the motorcycle 1, and FIG. 3 is a plan view of a portion of the motorcycle 1. The vehicle body frame 3 includes a left main frame 14L and a right main frame 14R each extending rearward from the head pipe 2. The vehicle body frame 3 includes a down frame 15 extending downward from the head pipe 2. The left main frame 14L is located leftward of the vehicle center line CL, and the right main frame 14R is located rightward of the vehicle center line CL. The down frame 15 is located below the left main frame 14L and the right main frame 14R.

The left main frame 14L includes a first connecting portion 14a connected to the head pipe 2, a first front-rear extending portion 14b extending rearward from the first connecting portion 14a, and a first up-down extending portion 14d extending downward from a lower end 14c of the first front-rear extending portion 14b. As shown in FIG. 3, the shapes of the left main frame 14L and the right main frame 14R are in left-right symmetry with each other. The right main frame 14R includes a second connecting portion 14e connected to the head pipe 2, a second front-rear extending portion 14f extending rearward from the second connecting portion 14e, and a second up-down extending portion 14h extending downward from a lower end 14g of the second front-rear extending portion 14f. As shown in FIG. 2, the left main frame 14L has an upper outline 14p and a lower outline 14q, as the vehicle is seen from the side. Although not shown in the figure, the right main frame 14R has a similar upper outline 14p and a similar lower outline 14q. As the vehicle is seen from the side, the upper outline 14p of the left main frame 14L and the upper outline 14p of the right main frame 14R are laid on each other, and the lower outline 14q of the left main frame 14L and the lower outline 14q of the right main frame 14R are laid on each other.

As shown in FIG. 3, the first front-rear extending portion 14b of the left main frame 14L includes a first portion 14b1 that deviates outward (i.e., leftward) in the vehicle width direction while extending rearward from the head pipe 2, and a second portion 14b2 that deviates inward (i.e., rightward) in the vehicle width direction while extending rearward from the first portion 14b1. The second front-rear extending portion 14f of the right main frame 14R includes a first portion 14f1 that deviates outward (i.e., rightward) in the vehicle width direction while extending rearward from the head pipe 2, and a second portion 14f2 that deviates inward (i.e., leftward) in the vehicle width direction while extending rearward from the first portion 14f1.

As shown in FIG. 2, the down frame 15 includes a third connecting portion 15a connected to the head pipe 2, and a third up-down extending portion 15b extending downward from the third connecting portion 15a. The third connecting portion 15a is located below the first connecting portion 14a and the second connecting portion 14e. As the vehicle is seen from the side, the inclination angle of the down frame 15 with respect to the horizontal line is greater than the inclination angle of the first front-rear extending portion 14b of the left main frame 14L with respect to the horizontal line and is greater than the inclination angle of the second front-rear extending portion 14f of the right main frame 14R with respect to the horizontal line.

The left main frame 14L and the down frame 15 are linked together via a left connecting frame 17L. Herein, the front end portion of the left connecting frame 17L is connected to the down frame 15, and the rear end portion of the left connecting frame 17L is connected to the first front-rear extending portion 14b of the left main frame 14L. Similarly, the right main frame 14R and the down frame 15 are linked together via a right connecting frame 17R. The front end portion of the right connecting frame 17R is connected to the down frame 15, and the rear end portion of the right connecting frame 17R is connected to the second front-rear extending portion 14f of the right main frame 14R. The dimension of the left connecting frame 17L in the up-down direction is smaller than the dimension of the left main frame 14L in the up-down direction. The dimension of the right connecting frame 17R in the up-down direction is smaller than the dimension of the right main frame 14R in the up-down direction. The left connecting frame 17L is thinner than the left main frame 14L, and the right connecting frame 17R is thinner than the right main frame 14R.

Figure 5:
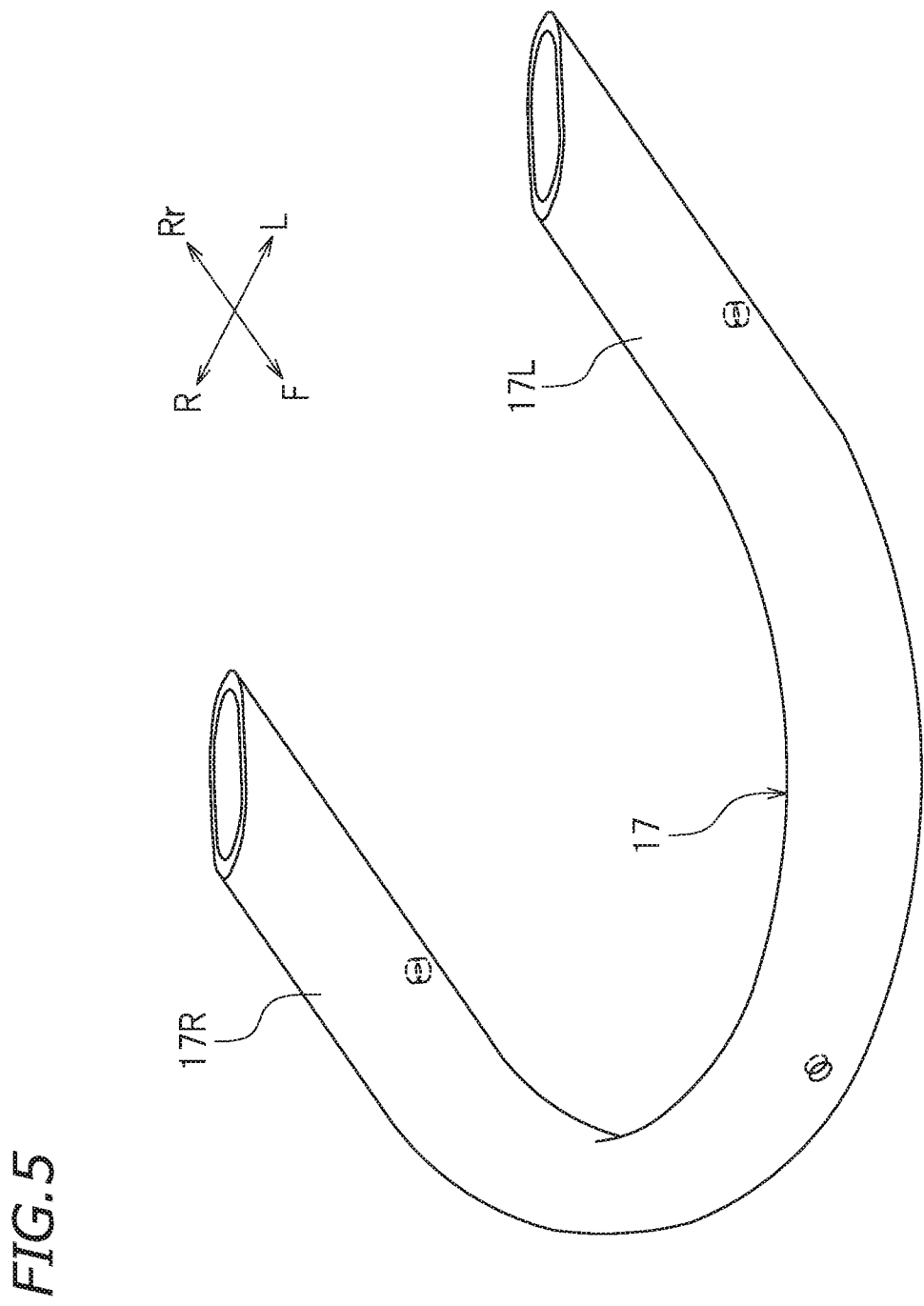
FIG. 5 is a perspective view of a left connecting frame and a right connecting frame.

The left connecting frame 17L and the right connecting frame 17R may be separate from each other or may be an integral piece. The left connecting frame 17L and the right connecting frame 17R are a single U-shaped pipe 17, as shown in FIG. 5. The pipe 17 is welded to the down frame 15. Herein, the left half of the pipe 17 is the left connecting frame 17L, and the right half thereof is the right connecting frame 17R.

Figure 4:
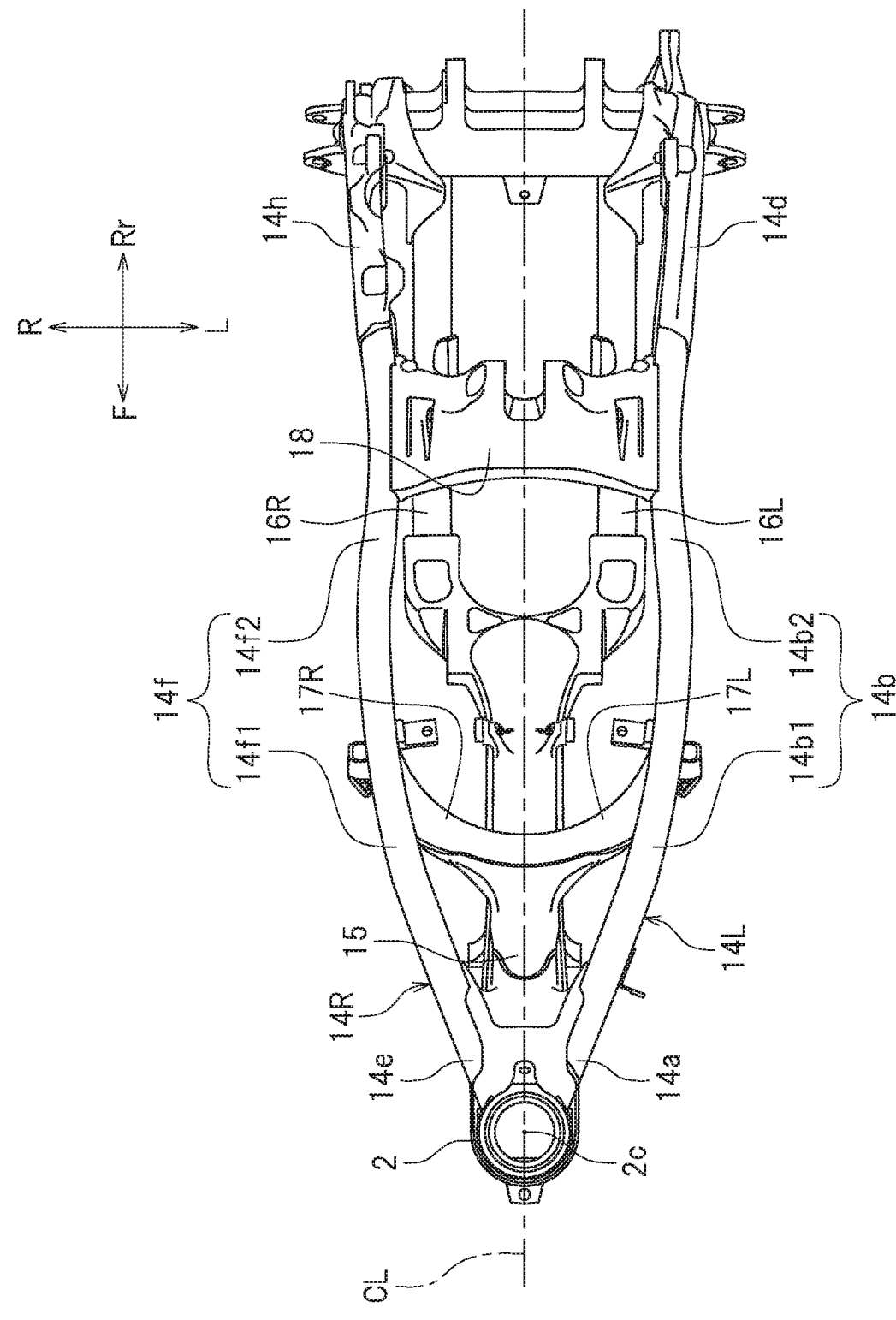
FIG. 4 is a plan view of a vehicle body frame.

As shown in FIG. 4, the first front-rear extending portion 14b of the left main frame 14L and the second front-rear extending portion 14f of the right main frame 14R are connected together via a cross frame 18. The cross frame 18 extends in the vehicle width direction. The left end portion of the cross frame 18 is connected to the first front-rear extending portion 14b, and the right end portion thereof is connected to the second front-rear extending portion 14f. Herein, the left end portion of the cross frame 18 is connected to the second portion 14b2 of the first front-rear extending portion 14b. The right end portion of the cross frame 18 is connected to the second portion 14f2 of the second front-rear extending portion 14f. The cross frame 18 is shaped so that the dimension thereof in the front-rear direction is larger than the dimension thereof in the up-down direction. Note however that this and the placement of the cross frame 18 are merely illustrative, and the present invention is not limited to the illustrated embodiment.

The broken line 18K of FIG. 2 represents a cross section of the cross frame 18 at the center in the vehicle width direction. Note that in the present embodiment, the position of the center of the cross frame 18 in the vehicle width direction coincides with the position of the vehicle center line CL. Note that the vehicle center line CL is a line extending in the vehicle front-rear direction passing through a central axis 2c of the head pipe 2 as seen from above. As shown in FIG. 2, as the vehicle is seen from the side, a centroid 18P of the central cross section 18K in the vehicle width direction of the cross frame 18 is located within an area that is delimited by an upper extension 17r obtained by extending rearward an upper outline 17p of the left connecting frame 17L, a lower extension 17s obtained by extending rearward a lower outline 17q of the left connecting frame 17L, the upper outline 14p of the left main frame 14L and the lower outline 14q of the left main frame 14L. Moreover, as the vehicle is seen from the side, the centroid 18P is located within an area that is delimited by the upper extension 17r obtained by extending rearward the upper outline 17p of the right connecting frame 17R, the lower extension 17s obtained by extending rearward the lower outline 17q of the right connecting frame 17R, the upper outline 14p of the right main frame 14R and the lower outline 14q of the right main frame 14R.

In the motorcycle 1 according to the present embodiment, the cross frame 18 is located at a position relatively far away from the head pipe 2. The present invention is not limited to any particular distance between the cross frame 18 and the head pipe 2, but the distance L1 between the central axis 2c of the head pipe 2 and the centroid 18P of the cross frame 18 is twice or more the dimension L2 of the head pipe 2 in the central axis direction. L1 may be two to three times L2.

In the motorcycle 1, a portion where the left connecting frame 17L and the left main frame 14L are connected together and a portion where the right connecting frame 17R and the right main frame 14R are connected together are located at positions relatively far away from the head pipe 2. Herein, as the vehicle is seen from the side, the distance L3 between the intersection point 17n between the upper extension 17r of the left connecting frame 17L and the central line 14j of the left main frame 14L and the central axis 2c of the head pipe 2 is twice or more the dimension L2 of the head pipe 2 in the central axis direction. That is, L3≥2×L2. Similarly, as the vehicle is seen from the side, the distance L3 between the intersection point 17n between the upper extension 17r of the right connecting frame 17R and the central line 14j of the right main frame 14R and the central axis 2c of the head pipe 2 is twice or more the dimension L2 of the head pipe 2 in the central axis direction. That is, L3≥2×L2. The dimension L3 is set to a value close to the dimension L1. Herein, L3 is set to be 0.8 to 1 time L1. 0.8×L1≤L3≤1.0×L1. Note however that the relationship between L1 to L3 described above is illustrative, and the present invention is not limited to the illustrated embodiment.

The vehicle body frame 3 includes left and right upper seat frames 19A and 19C and left and right lower seat frames 19B and 19D (see FIG. 3) supporting the seat 8. As shown in FIG. 3, the front end portions of the left and right upper seat frames 19A and 19C are connected to the cross frame 18. The upper seat frames 19A and 19C extend rearward from the cross frame 18. As the vehicle is seen from the side, points 19a at which the upper seat frames 19A and 19C are attached to the cross frame 18 are located above the upper extension 17r of the left connecting frame 17L and the upper extension 17r of the right connecting frame 17R. Note however that the present invention is not limited to one particular position of the point of attachment 19a. The front end portion of the left lower seat frame 19B is connected to the first up-down extending portion 14d of the left main frame 14L. The rear end portion of the left upper seat frame 19A and the rear end portion of the left lower seat frame 19B are connected to each other. The front end portion of the right upper seat frame 19C is connected to the second up-down extending portion 14h of the right main frame 14R. The rear end portion of the right upper seat frame 19C and the rear end portion of the right lower seat frame 19D are connected together.

As shown in FIG. 3, a rear cross frame 44 and a rear cross frame 45 located rearward of the rear cross frame 44 are connected to the left upper seat frame 19A and the right upper seat frame 19C.

As shown in FIG. 2 and FIG. 4, the vehicle body frame 3 includes a left lower frame 16L that connects together the down frame 15 and the first up-down extending portion 14d of the left main frame 14L, and a right lower frame 16R that connects together the down frame 15 and the second up-down extending portion 14h of the right main frame 14R. The front end portion of the left lower frame 16L and the front end portion of the right lower frame 16R are connected to the lower end portion of the third up-down extending portion 15b of the down frame 15. The rear end portion of the left lower frame 16L is connected to the lower end portion of the first up-down extending portion 14d. The rear end portion of the right lower frame 16R is connected to the lower end portion of the second up-down extending portion 14h.

As shown in FIG. 3, an upper end portion 60a of a rear cushion unit 60 is supported on the cross frame 18. The upper end portion 60a of the rear cushion unit 60 is pivotally supported on the central portion of the cross frame 18 in the vehicle width direction. In FIG. 2, reference sign 60b represents the pivotal point of the upper end portion 60a of the rear cushion unit 60. Reference sign 60d represents the lower end portion of the rear cushion unit 60. As the vehicle is seen from the side, the pivotal point 60b is located between the upper extension 17r obtained by extending rearward the upper outline 17p of the left connecting frame 17L and the lower extension 17s obtained by extending rearward the lower outline 17q of the left connecting frame 17L. Although not shown in the figure, the pivotal point 60b is located between the upper extension 17r obtained by extending rearward the upper outline 17p of the right connecting frame 17R and the lower extension 17s obtained by extending rearward the lower outline 17q of the right connecting frame 17R, as the vehicle is seen from the side. The pivotal point 60b is located upward and rearward of the upper outline 14p of the left main frame 14L and the right main frame 14R, as the vehicle is seen from the side, in the present embodiment, but the present invention is not limited to the illustrated placement of the pivotal point 60b.

The engine unit 4 includes a crankcase 20, a cylinder body 21, a cylinder head 22 and a cylinder head cover 23. The cylinder body 21 is located on top of the crankcase 20, the cylinder head 22 is located on top of the cylinder body 21, and the cylinder head cover 23 is located on top of the cylinder head 22. Although not shown in the figure, the crank shaft of the internal combustion engine is accommodated inside the crankcase 20. A cylinder that slidably accommodates a piston therein is formed inside the cylinder body 21. An intake port and an exhaust port are formed in the cylinder head 22, and an intake cam and an exhaust cam are accommodated in the cylinder head 22. The cylinder head cover 23 is connected to the upper portion of the cylinder head 22.

The engine unit 4 is suspended on the vehicle body frame 3. A portion of the engine unit 4 is supported on the down frame 15 via a bracket 24. Another portion of the engine unit 4 is supported on the lower frames 16L and 16R via brackets 25. Another portion of the engine unit 4 is supported on the main frames 14L and 14R via brackets 26.

As shown in FIG. 2, the left connecting frame 17L and the cylinder head cover 23 partially overlap with each other, as the vehicle is seen from the side. Similarly, the right connecting frame 17R and the cylinder head cover 23 partially overlap with each other, as the vehicle is seen from the side.

The internal combustion engine of the engine unit 4 is a water-cooled internal combustion engine. The motorcycle 1 includes a radiator 27. The radiator 27 serves to radiate heat of the cooling water of the internal combustion engine. The radiator 27 is supported on the vehicle body frame 3. The radiator 27 is secured on the down frame 15. The radiator 27 is located forward of the engine unit 4. The radiator 27 is located below the head pipe 2.

Figure 6:
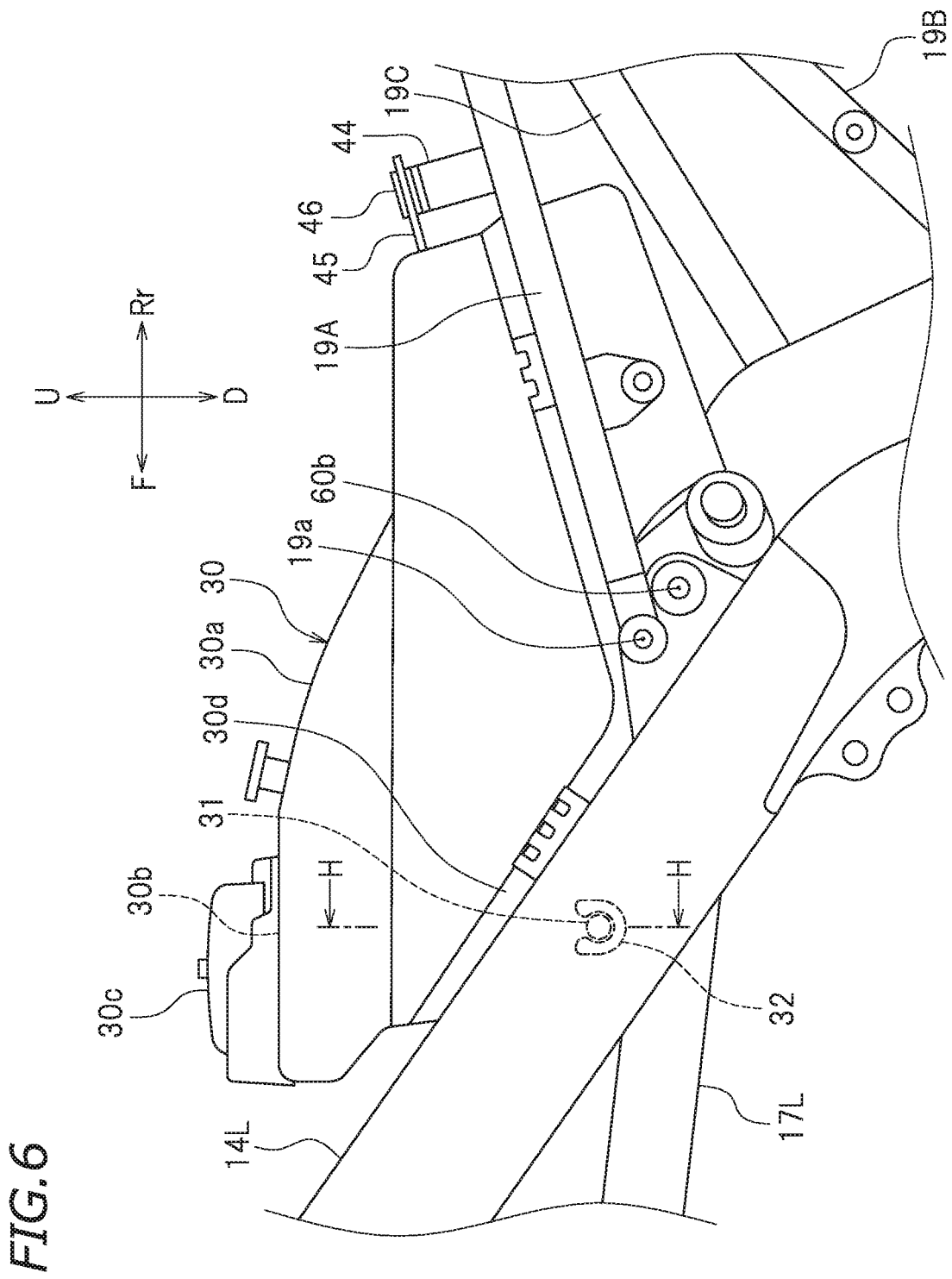
FIG. 6 is a side view of a fuel tank and a portion of the vehicle body frame.
Figure 7:
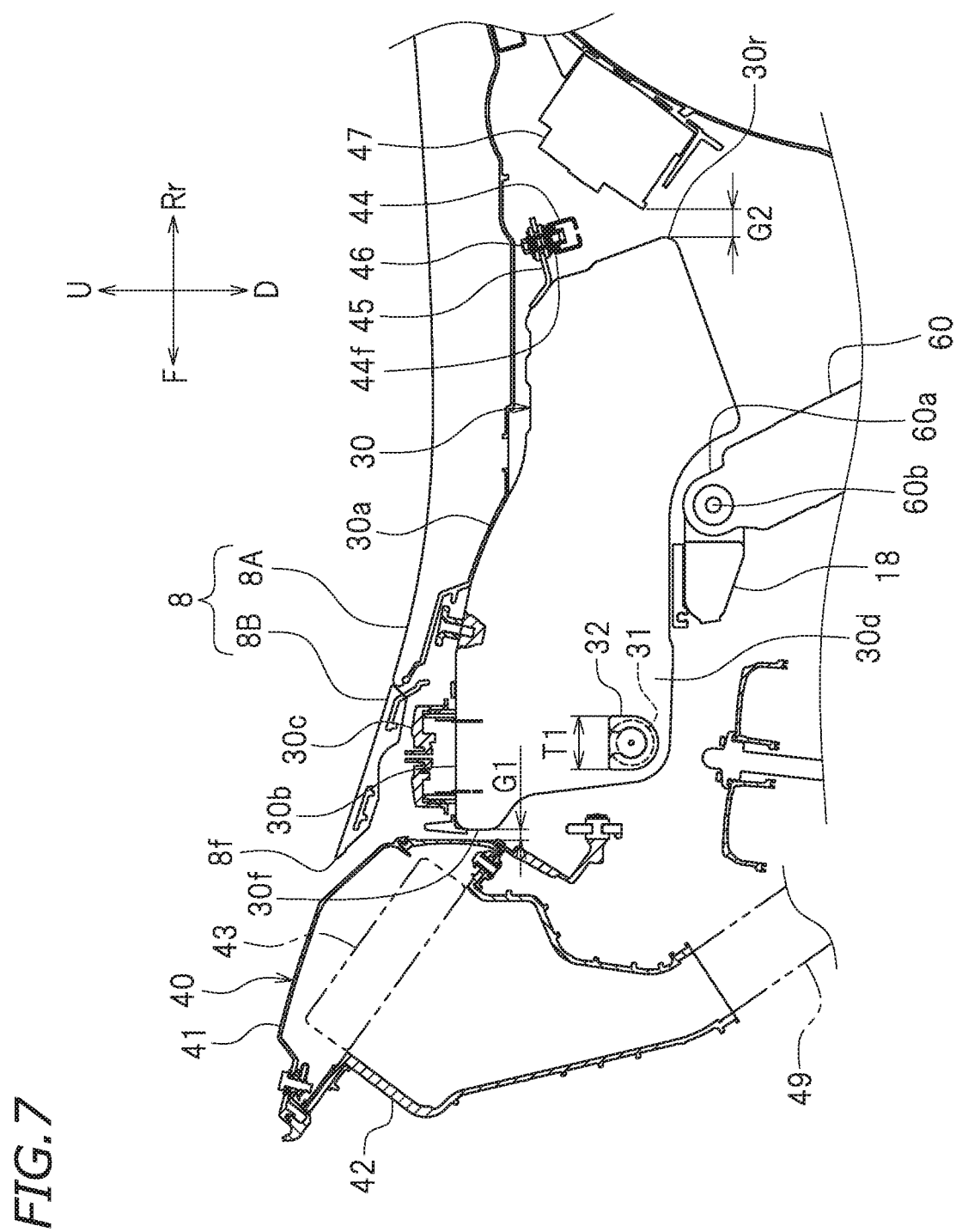
FIG. 7 is a side view schematically showing a portion of the motorcycle.

As shown in FIG. 6, the motorcycle 1 includes a fuel tank 30. Fuel to be supplied to the internal combustion engine of the engine unit 4 is stored in the fuel tank 30. As shown in FIG. 7, the fuel tank 30 includes a tank body 30a, and a cap 30c attached to an oil fill port 30b in the upper portion of the tank body 30a. The present invention is not limited by any one position of the cap 30c, but the embodiment shown in FIG. 7, the cap 30c is located in the front portion of the tank body 30a. The tank body 30a includes a left and a right side wall 30d. Note that the shape of the fuel tank 30 is simplified in FIG. 7.

Figure 8:
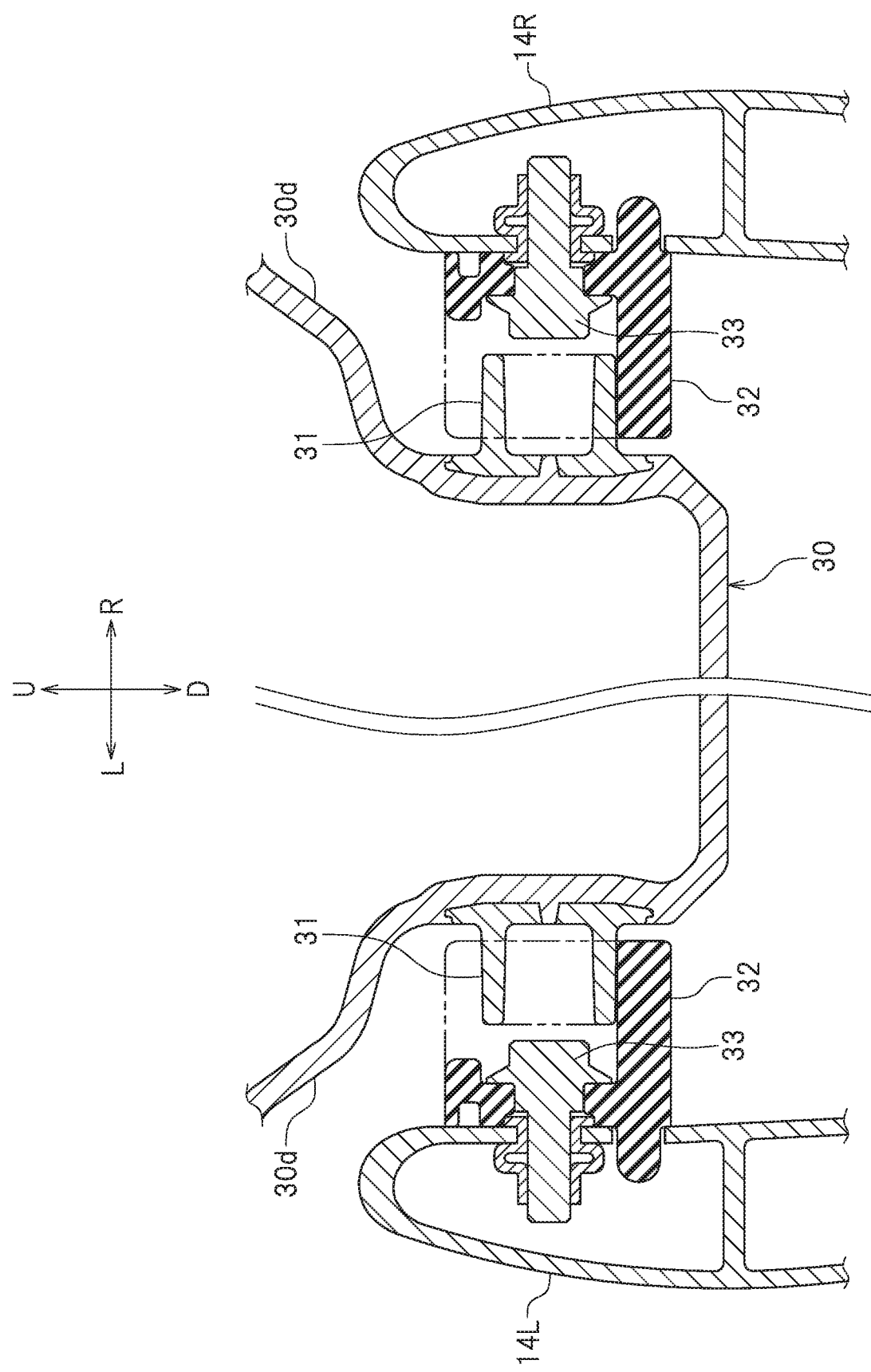
FIG. 8 is a cross-sectional view taken along line H-H of FIG. 6.

FIG. 8 shows a cross section taken along line H-H of FIG. 6. Note however that the central portion in the vehicle width direction is not shown. As shown in FIG. 8, the left and right side walls 30d are each provided with a protruding member 31 extending sideways. While the protruding member 31 is herein formed by a cylindrical member, the present invention is not limited to a cylindrical shape. Although the protruding member 31 may be assembled onto the side wall 30d via a bolt, or the like, according to one embodiment, the protruding member 31 is integral with the side wall 30d. In the embodiment illustrated in FIG. 8, the protruding member 31 and the side wall 30d are made of a resin and the protruding member 31 may be connected within the side wall 30d prior to curing of the side wall so that the protruding member 31 and side wall 30d are integral together upon curing of the resin of the side wall 30d. Alternatively, the protruding member 31 and side wall 30d may be formed simultaneously, such as in a single mold. As shown in FIG. 7, the protruding member 31 is provided in the front portion of the side wall 30d. The protruding member 31 is located directly below the cap 30c, as the vehicle is seen from the side. Note however that the present invention is not limited to any one position of the protruding member 31.

Figure 9:
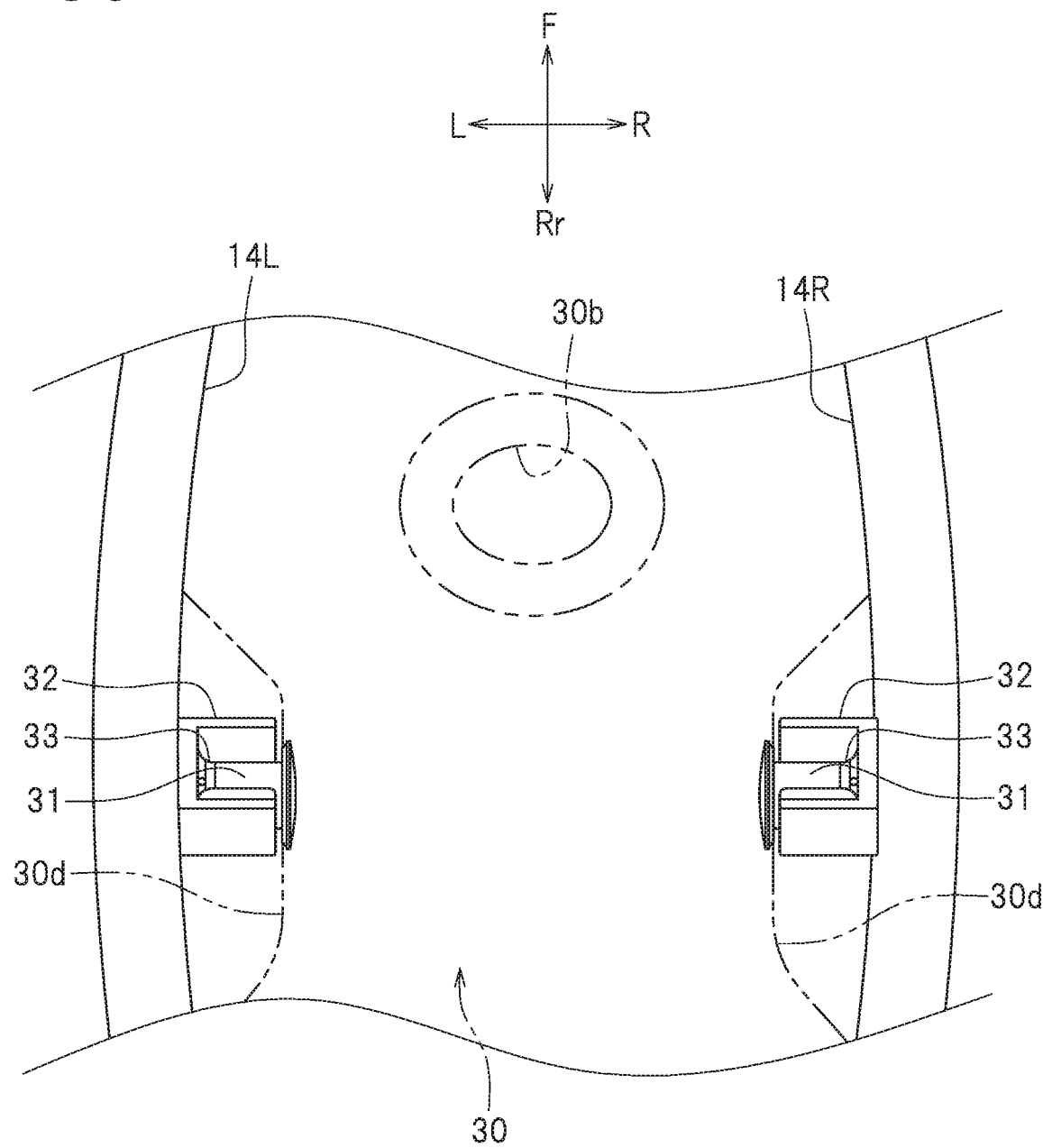
FIG. 9 is a plan view of a main frame, a protruding member and a rubber bracket.
Figure 10:
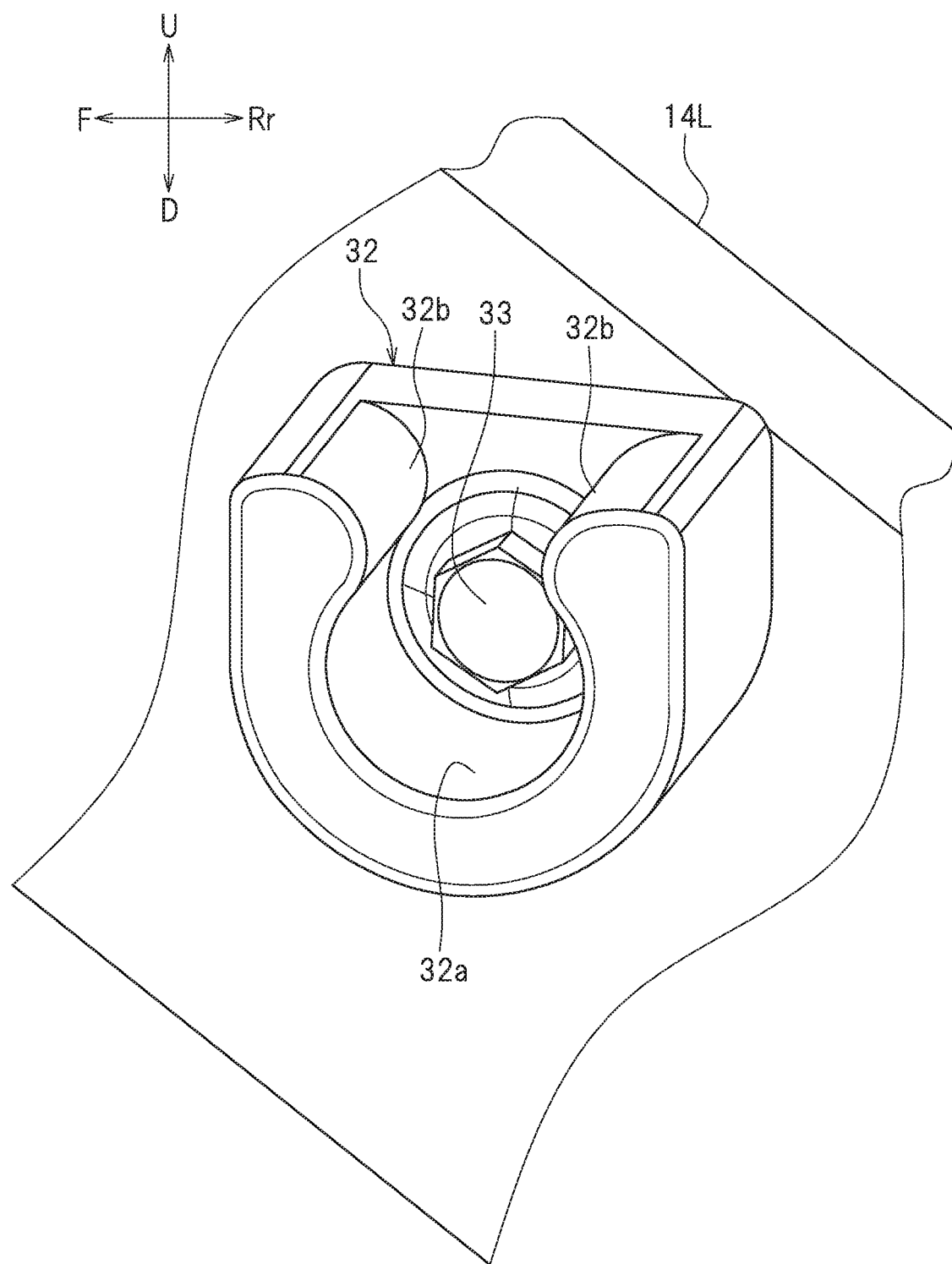
FIG. 10 is a perspective view of the rubber bracket.

As shown in FIG. 9, rubber brackets 32 are attached to the left main frame 14L and the right main frame 14R. The rubber brackets 32 are fastened to the left main frame 14L and the right main frame 14R via bolts 33. Note however that the present invention is not limited to the above attachment of the rubber brackets 32. The rubber brackets 32 are attached to the inner surfaces in the vehicle width direction of the left main frame 14L and the right main frame 14R. As shown in FIG. 6, the left main frame 14L and the rubber bracket 32 are laid on each other, as the vehicle is seen from the side. The right main frame 14R and the rubber bracket 32 are laid on each other, as the vehicle is seen from the side. As shown in FIG. 10, the rubber brackets 32 are formed in a concave shape that is open upward. Also, the rubber brackets 32 are open on the inner side thereof in the vehicle width direction.

As shown in FIG. 8 and FIG. 9, the rubber brackets 32 are configured to engage with the protruding members 31 of the fuel tank 30. When the protruding members 31 are pushed into the rubber brackets 32 in the downward direction, the protruding members 31 are fitted into the rubber brackets 32. The protruding members 31 can be fitted into the rubber brackets 32 simply by pushing down the fuel tank 30 from above. Thus, the front portion of the fuel tank 30 is supported on the main frames 14L and 14R via the protruding members 31 and the rubber brackets 32. As shown in FIG. 10, the rubber bracket 32 includes a supporting portion 32a that supports the protruding member 31, and a pair of, front and rear, barb portions 32b located above the supporting portion 32a. The front barb portion 32b bulges rearward while extending upward, and the rear barb portion 32b bulges forward while extending upward. The barb portions 32b are formed so that the interval therebetween narrows while extending upward. Therefore, once the protruding member 31 is supported on the supporting portion 32a, the protruding member 31 is unlikely to come off the rubber bracket 32.

As shown in FIG. 7, a bracket 45 is secured on a portion of the fuel tank 30 that is rearward of the middle of the fuel tank 30 in the vehicle front-rear direction. The bracket 45 is an example of a fastened portion of the fuel tank 30. The bracket 45 is fastened to the vehicle body frame 3 via a bolt 46. Herein, the bracket 45 is fastened to the rear cross frame 44 via the bolt 46. A rear end 30r of the fuel tank 30 is located rearward of a front end 44f of the rear cross frame 44. A portion of the fuel tank 30 overlaps with the rear cross frame 44, as the vehicle is seen from above (see FIG. 3).

The seat 8 is located over the fuel tank 30. At least a portion of the seat 8 is supported on the fuel tank 30. The seat 8 includes a main seat 8A, and a sub-seat 8B located forward of the main seat 8A. The front end of the main seat 8A and the front end of the sub-seat 8B are located forward of the middle position of the fuel tank 30 in the vehicle front-rear direction. A front end 8f of the sub-seat 8B is the front end of the seat 8. The front end 8f of the seat 8 is located forward of the middle position of the fuel tank 30 in the vehicle front-rear direction. The front end 8f of the seat 8 is located forward of a front end 30f of the fuel tank 30 in the vehicle front-rear direction. Note however that the placement of the seat 8 is illustrative, and the present invention is not limited to the illustrated embodiment.

An air cleaner 40 is located forward of the fuel tank 30. The fuel tank 30 is located near the air cleaner 40. The minimum interval G1 between the fuel tank 30 and the air cleaner 40 in the vehicle front-rear direction is smaller than the dimension T1 of the rubber bracket 32 in the vehicle front-rear direction. A battery 47 is located rearward of the fuel tank 30. The fuel tank 30 is located near the battery 47. The minimum interval G2 between the fuel tank 30 and the battery 47 in the vehicle front-rear direction is smaller than the dimension T1 of the rubber bracket 32 in the vehicle front-rear direction.

The air cleaner 40 is located rearward of the head pipe 2. The air cleaner 40 includes an upper case 41, a lower case 42 located below the upper case 41, and an air cleaner element 43 provided between the upper case 41 and the lower case 42. The air cleaner 40 is configured so that the air introduced into the upper case 41 is cleaned while passing through the air cleaner element 43, and the cleaned air is supplied to the lower case 42. An intake pipe 49, provided with a throttle body (not shown), etc., is connected to the lower portion of the lower case 42. The intake pipe 49 connects between the air cleaner 40 and the internal combustion engine of the engine unit 4.

As shown in FIG. 1, the motorcycle 1 includes a left and a right side cover 50. The left and right side covers 50 are located leftward and rightward of the vehicle center line CL, respectively. The left side cover 50 and the right side cover 50 may be located in left-right symmetry, or left-right asymmetry, with each other with respect to a vertical plane containing the vehicle center line CL. The shape of the left side cover 50 and the right side cover 50 may be in left-right symmetry, or left-right asymmetry, with each other with respect to a vertical plane containing the vehicle center line CL. For example, the shape of the surface-side portion (in other words, the outer portion in the vehicle width direction) of the left side cover 50 and the right side cover 50 may be in left-right symmetry while the shape of the reverse-side portion (in other words, the inner portion in the vehicle width direction) may be in left-right asymmetry. The shape of the left side cover 50 and the right side cover 50 may be in left-right symmetry at least with respect to a duct formation portion 50d to be described below. The left side cover 50 will be described below and the description of the right side cover 50 will be omitted.

Figure 11:
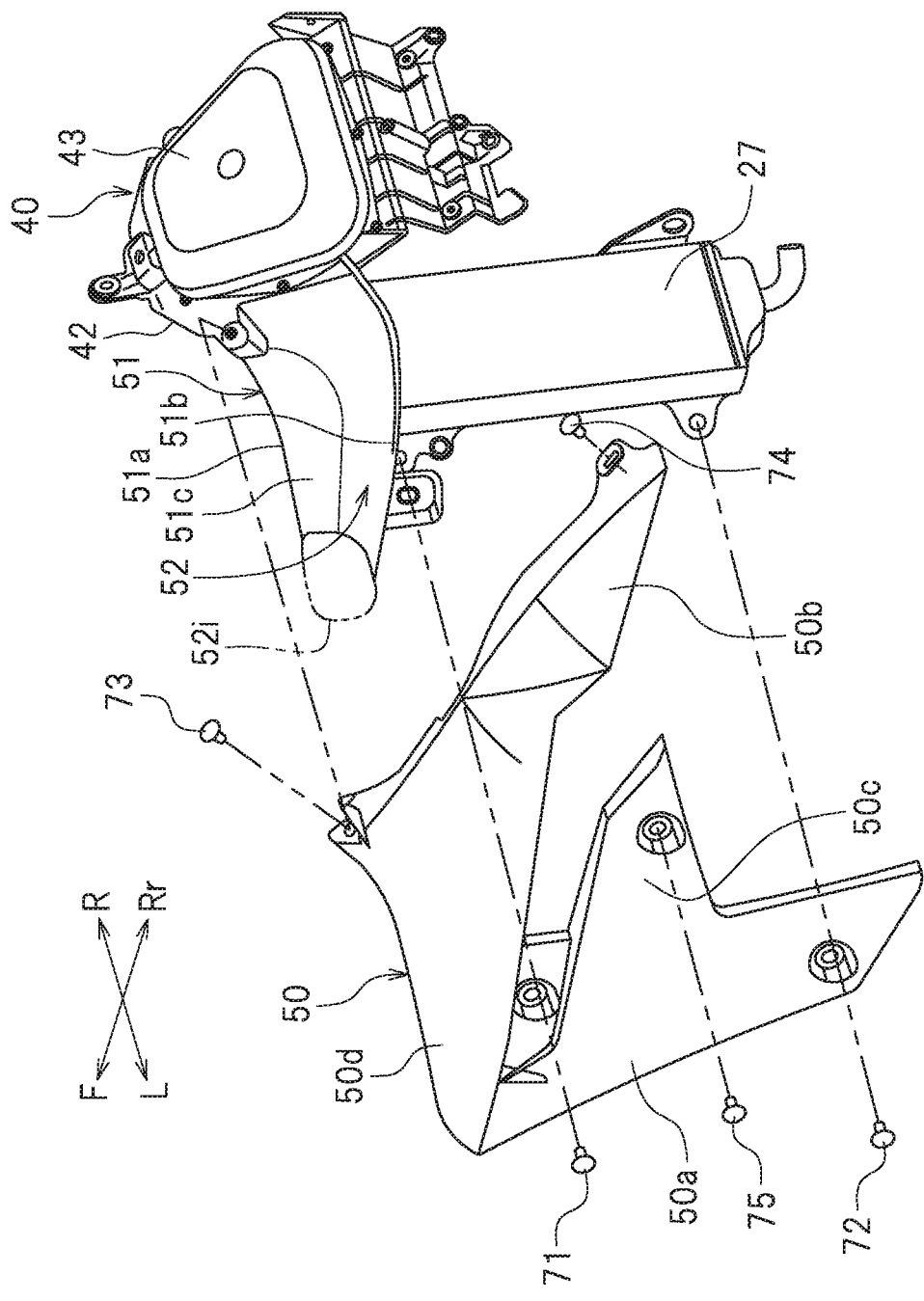
FIG. 11 is an exploded perspective view of a portion of a side cover, a duct part and an air cleaner, and a radiator.

While the side cover 50 may be composed of a plurality of parts, it is in the present embodiment an integral large cover to be assembled onto other members, as shown in FIG. 11. In the embodiment, the side cover 50 is a single, integral part. As shown in FIG. 1, a portion of the side cover 50 is located below the cylinder head cover 23 of the engine unit 4. A portion of the side cover 50 is located below the cylinder head 22 of the engine unit 4. The side cover 50 includes a radiator cover portion 50a located outward of the radiator 27 in the vehicle width direction, a tank cover portion 50b located outward of the fuel tank 30 in the vehicle width direction, and a rearward portion 50c located outward of at least a portion of the intake pipe 49 in the vehicle width direction. The side cover 50 includes the duct formation portion 50d located forward of the tank cover portion 50b. The duct formation portion 50d is located above the radiator cover portion 50a and the rearward portion 50c.

While the present invention is not limited to any one material of the side cover 50, according to one embodiment, it is made of a resin. In addition, while the present invention is not limited to any one method for manufacturing the side cover 50, according to one embodiment, it is manufactured by injection molding. According to one embodiment, the side cover 50 is an injection-molded part.

As shown in FIG. 11, a duct part 51 extending forward in the vehicle front-rear direction from the lower case 42 is formed integrally with the lower case 42 of the air cleaner 40. A pair of, left and right, duct parts 51 are provided. In the present embodiment, the lower case 42 and the duct parts 51 are made of a resin, and are formed integrally together. However, embodiments of the invention encompass a lower case 42 and duct parts that are made of any material adequate for forming a shell or cover for engine parts. In addition, embodiments of the invention encompass a lower case 42 and duct parts 51 made separately and connected by fasteners, including bolts, screws, and welds.

Figure 12:
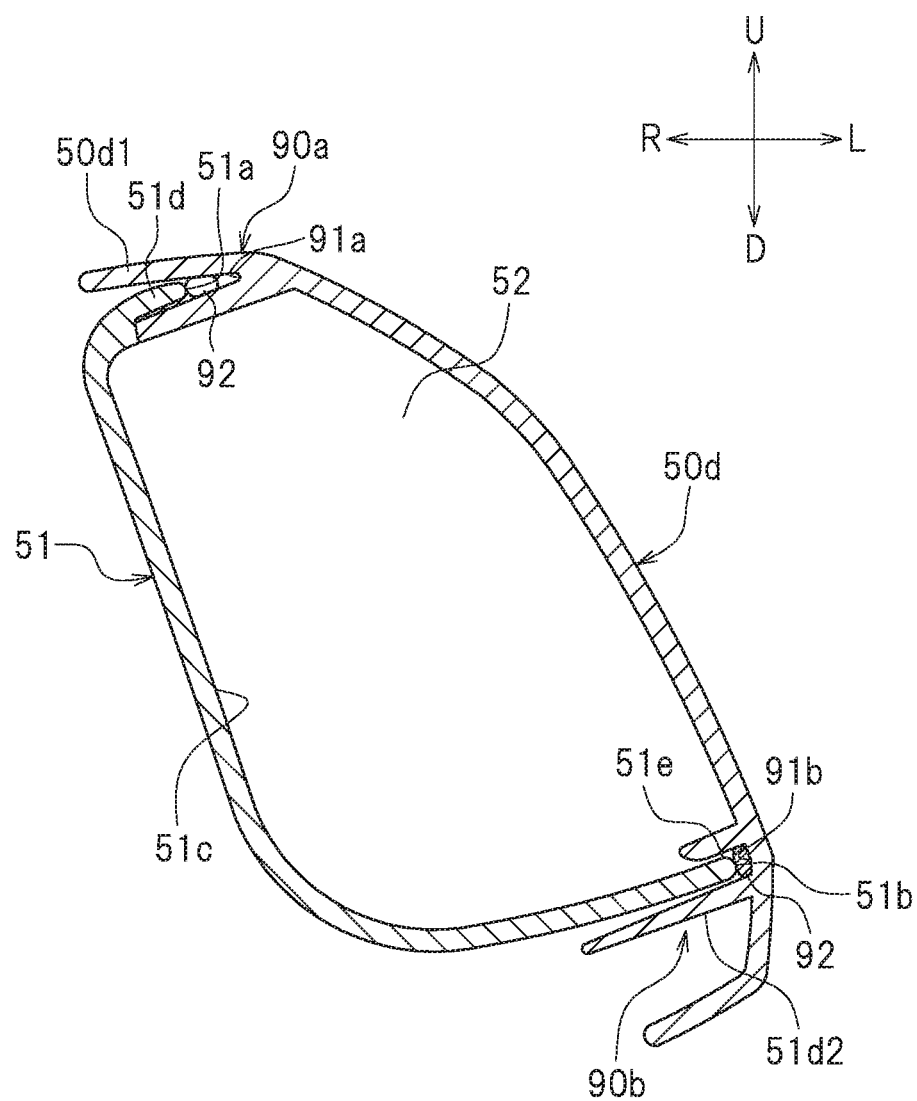
FIG. 12 is a cross-sectional view taken along line K-K of FIG. 1, showing the side cover and the duct part.

FIG. 12 is a cross-sectional view taken along line K-K of FIG. 1, showing the side cover 50 and the duct part 51. The duct part 51 is assembled onto the duct formation portion 50d of the side cover 50, thereby defining a duct 52 connected to the internal space between the upper case 41 and the air cleaner element 43 in the air cleaner 40.

Figure 14:
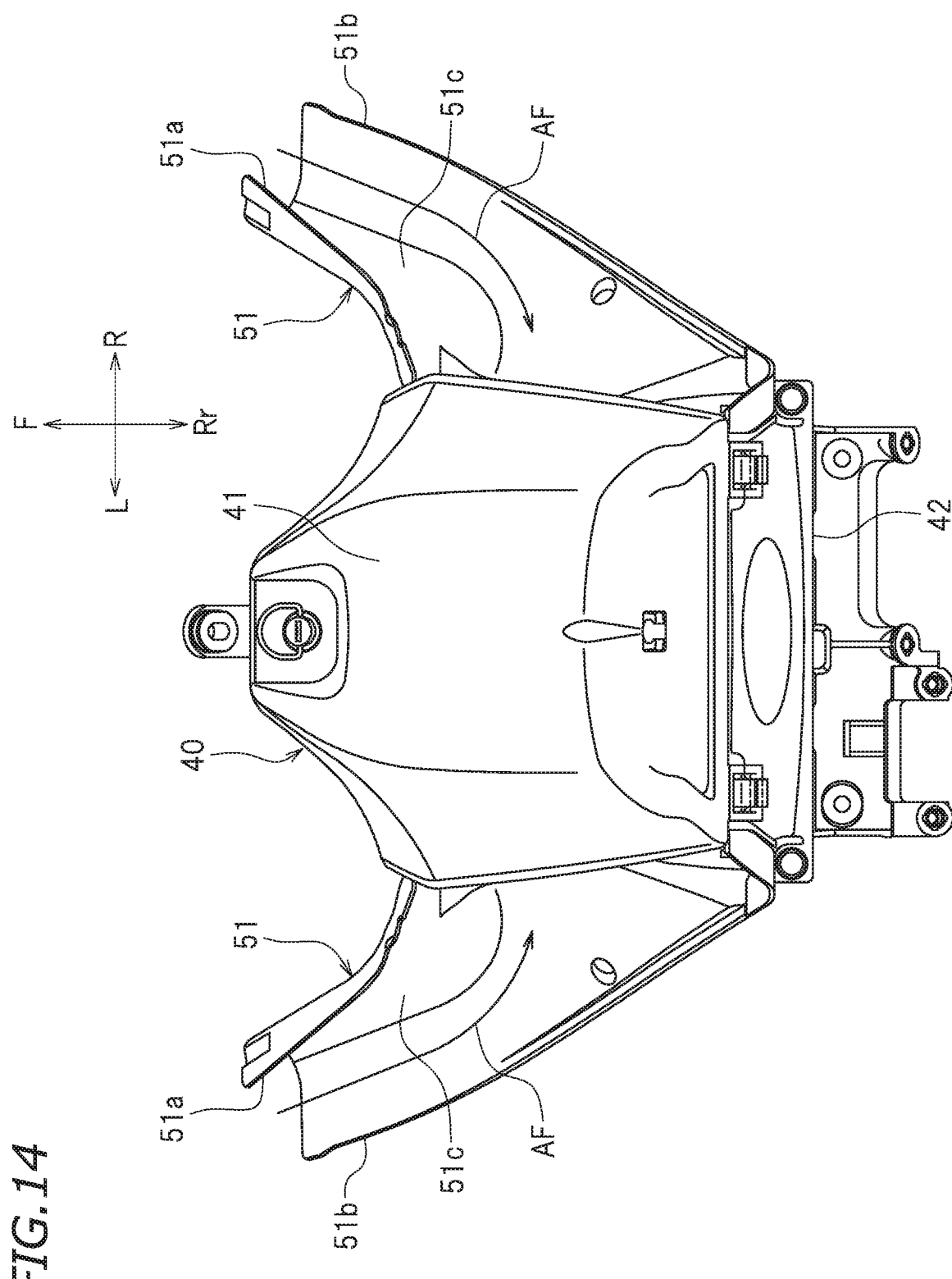
FIG. 14 is a plan view of the air cleaner and the duct part.
Figure 15:
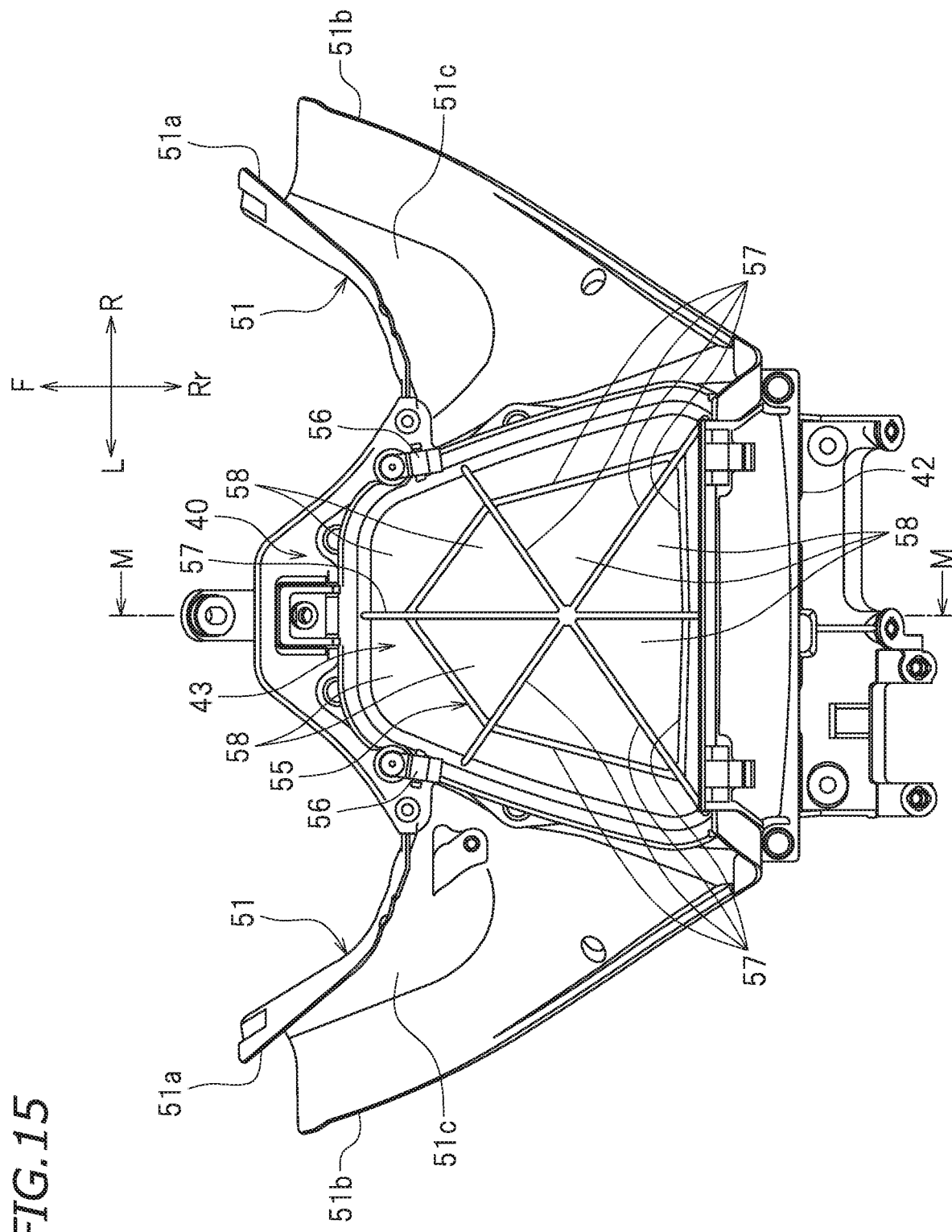
FIG. 15 is a plan view of the air cleaner and the duct part, with an upper case removed.

As shown in FIG. 14 and FIG. 15, the duct part 51 includes an upper edge 51a extending in the vehicle front-rear direction, a lower edge 51b extending in the vehicle front-rear direction and located below the upper edge 51a, and an inner wall 51c located between the upper edge 51a and the lower edge 51b and depressed inward in the vehicle width direction. As shown in FIG. 12, the duct formation portion 50d of the side cover 50 includes an upper C-shaped-section portion 90a and a lower C-shaped-section portion 90b. Grooves 91a and 91b are formed in the C-shaped-section portions 90a and 90b, respectively. The upper edge 51a of the duct part 51 is fitted into the groove 91a, and the lower edge 51b is fitted into the groove 91b. Note that reference sign 92 is a sealant. An upper portion 51d of the duct part 51 and an upper portion 50d1 of the duct formation portion 50d are stacked on each other. A lower portion 51e of the duct part 51 and a lower portion 51d2 of the duct formation portion 50d are stacked on each other. The lower edge 51b of the duct part 51 is located outward of the upper edge 51a in the vehicle width direction.

Figure 13:
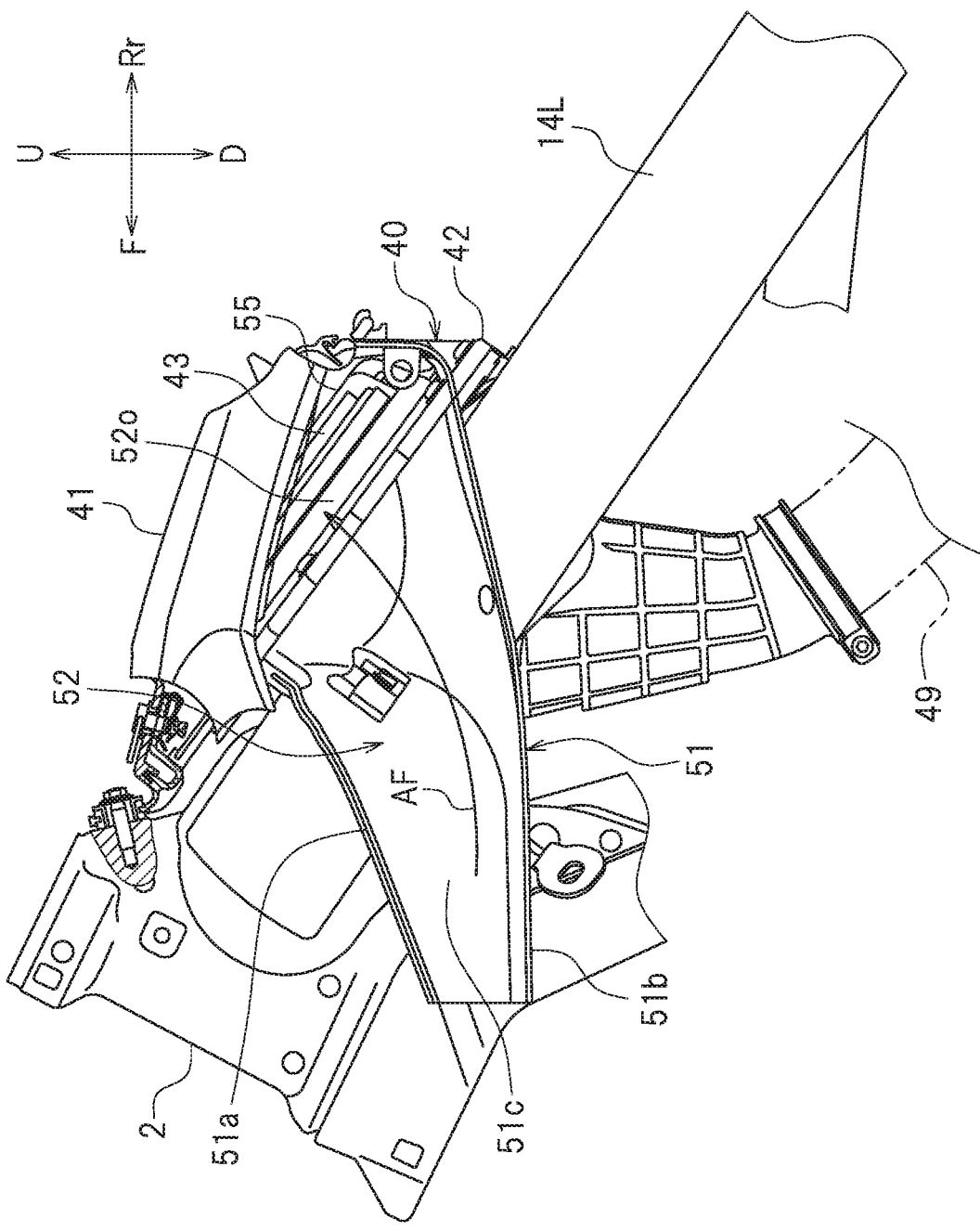
FIG. 13 is a side view of the air cleaner and the duct part.

An air inlet 52i that is open in the forward direction or in the inner direction of the vehicle width direction is formed at the front end of the duct 52 (see FIG. 11). The air inlet 52i is partitioned by the duct formation portion 50d of the side cover 50 and the duct part 51. The air is introduced into the duct 52 through the air inlet 52i. FIG. 13 is a side view of the air cleaner 40 and the duct part 51. As shown in FIG. 13, an air outlet 52o is formed at the rear end of the duct 52. The air outlet 52o is open toward the internal space between the upper case 41 and the air cleaner element 43 of the air cleaner 40. Note that the arrow AF in the figure represents the air flow.

Figure 16:
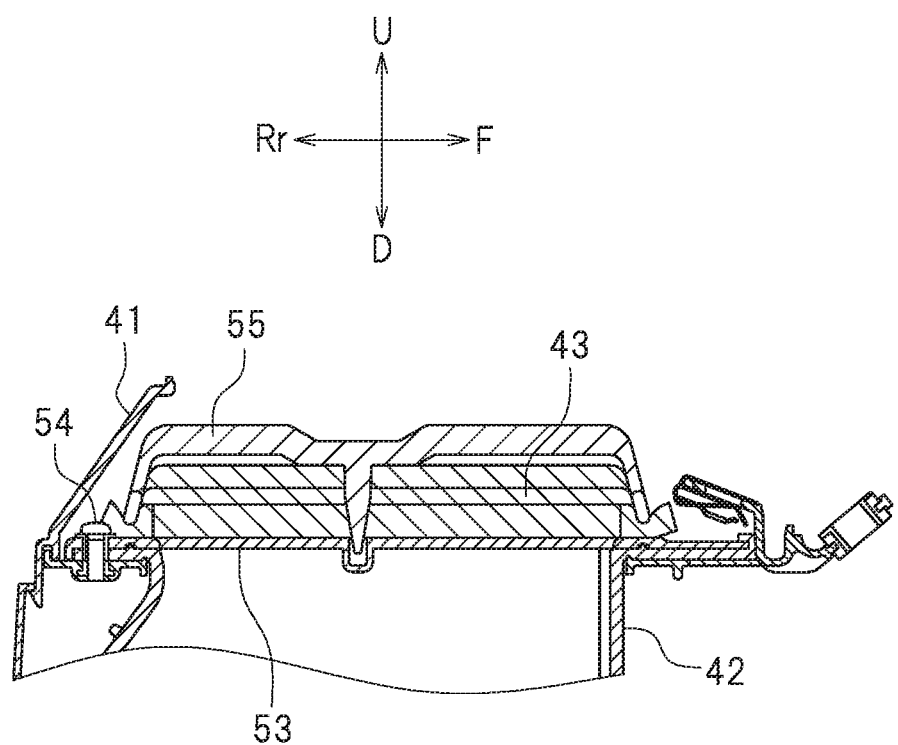
FIG. 16 is a cross-sectional view taken along line M-M of FIG. 15.

FIG. 14 is a plan view of a portion of the air cleaner 40 and the duct part 51. FIG. 15 is a plan view of a portion of the air cleaner 40 and the duct part 51, with the upper case 41 removed. FIG. 16 is a cross-sectional view taken alone line M-M of FIG. 15. As shown in FIG. 16, a holder 53 is fastened to the lower case 42 via a bolt 54. The air cleaner element 43 is located on the holder 53, and a holder 55 is located on the air cleaner element 43. As shown in FIG. 15, the holder 53 and the holder 55 each include a plurality of linear members 57. The holder 53 and the holder 55 are formed in a lattice pattern. Air paths 58, through which the air passes, are formed between the linear members 57. A portion of the holder 55 is inserted into the central portion of the holder 53 (see FIG. 16). The holder 55 is held down by a plate material 56. The holder 55 and the holder 53 are assembled together, as described above, with the air cleaner element 43 sandwiched between the holder 55 and the holder 53 (see FIG. 16). Thus, the air cleaner element 43 is held between the upper case 41 and the lower case 42.

As shown in FIG. 11, the side cover 50, the duct part 51 and the radiator 27 are assembled together via a bolt 71. The lower portion of the side cover 50 and the lower portion of the radiator 27 are assembled together via a bolt 72. The side cover 50 and the vehicle body frame 3 (not shown in FIG. 11) are assembled together via a bolt 75. The bolts 71, 72 and 75 are fastened from the side. A portion of the side cover 50 and a portion of the lower case 42 are laid on each other and are fastened together via a bolt 73. The tank cover portion 50b of the side cover 50 and the fuel tank 30 (not shown in FIG. 11) are fastened together via a bolt 74. The bolt 73 and the bolt 74 are fastened from above. Note that while bolts 71 to 75 are an example fastener, the fastener is not limited to bolts. The fastener may be screws, or the like.

As described above, with the motorcycle 1 according to the present embodiment, the protruding members 31 extending sideways from the side walls 30d of the fuel tank 30 engage with the rubber brackets 32 attached to the main frames 14L and 14R, thus supporting the fuel tank 30 on the main frames 14L and 14R. Since this support does not need a bolt, or the like, it is possible to reduce the number of parts and it is easy to install the fuel tank 30. Since the rubber brackets 32 are formed in a recessed shape that is open upward, the protruding members 31 can be engaged with the rubber brackets 32 simply by moving the fuel tank 30 downward, thus pressing down the protruding members 31 from above onto the rubber brackets 32. Since there is no need to slide the fuel tank 30 forward when installing the fuel tank 30, there is no need to reserve extra space rearward of the installed fuel tank 30. Since there is no need to reserve extra space according to the present embodiment, the fuel tank 30 can be located so that a portion of the fuel tank 30 overlaps with the rear cross frame 44 as the vehicle is seen from above, and it is therefore possible to save space rearward of the fuel tank 30.

While embodiments of the invention are not limited to any one shape of the rubber bracket 32, the rubber bracket 32 in the present embodiment includes the supporting portion 32a and a pair of, front and rear, barb portions 32b located so that the interval therebetween narrows while extending upward. Therefore, it is possible to more reliably prevent the protruding members 31 from coming off the rubber brackets 32. Therefore, the fuel tank 30 can be supported stably on the main frames 14L and 14R.

While the present invention is not limited to any one manner for securing the rubber brackets 32 on the main frames 14L and 14R, according to one embodiment, the rubber brackets 32 are fastened to the main frames 14L and 14R via bolts 33 in the present embodiment. Thus, the rubber brackets 32 can be secured stably on the main frames 14L and 14R. Therefore, the fuel tank 30 can be supported stably on the main frames 14L and 14R.

According to the present embodiment, the protruding members 31 are formed integrally with the fuel tank 30. The protruding members 31 will not rattle with respect to the fuel tank 30. Therefore, the fuel tank 30 can be supported stably on the main frames 14L and 14R.

The present invention is not limited to any one manner for the placement of the protruding members 31 and the rubber brackets 32. For example, the bottom of the fuel tank 30 may be recessed upward, thereby forming side walls facing inward in the vehicle width direction, and protruding members may be provided on the side walls. In such a case, the rubber brackets 32 may be located outward of the main frames 14L and 14R in the vehicle width direction. According to the present embodiment, however, the protruding members 31 and the rubber brackets 32 are located inward of the main frames 14L and 14R in the vehicle width direction. Thus, it is possible to reduce the dimension of the fuel tank 30 in the vehicle width direction.

According to the present embodiment, the main frames 14L and 14R overlap with the rubber brackets 32, as the vehicle is seen from the side, as shown in FIG. 6. The protruding members 31 and the rubber brackets 32 do not protrude upward or downward from the main frames 14L and 14R. When the protruding members 31 and the rubber brackets 32 protrude upward or downward from the main frames 14L and 14R, there will be needed separate covers for covering the protruding members 31 and the rubber brackets 32 from the side, but such covers are not needed according to the present embodiment.

According to the present embodiment, at least a portion of the seat 8 is supported on the fuel tank 30. The fuel tank 30 can be pressed from above by the weight of the seat 8 and the weight of the rider seated on the seat 8. Therefore, it is possible to reliably prevent the protruding member 31 from coming off the rubber bracket 32, and the fuel tank 30 can be supported stably on the main frames 14L and 14R.

As shown in FIG. 7, according to the present embodiment, the front end 8f of the seat 8 is located forward of the middle position of the fuel tank 30 in the vehicle front-rear direction. Moreover, the front end 8f of the seat 8 is located forward of the front end 30f of the fuel tank 30 in the vehicle front-rear direction. With such a placement, the fuel tank 30 can be desirably pressed from above by the seat 8 and the rider on the seat 8, and the fuel tank 30 can be supported stably on the main frames 14L and 14R.

According to the present embodiment, the fuel tank 30 can be installed on the main frames 14L and 14R via the protruding members 31 and the rubber brackets 32 simply by moving the fuel tank 30 in the downward direction. Since there is no need to slide the fuel tank 30 rearward when installing the fuel tank 30, it is possible to reduce the interval between the fuel tank 30 and the air cleaner 40 located forward of the fuel tank 30. In the present embodiment, the minimum interval G1 between the fuel tank 30 and the air cleaner 40 in the vehicle front-rear direction is smaller than the dimension T1 of the rubber bracket 32 in the vehicle front-rear direction. According to the present embodiment, it is possible to avoid creating dead space forward of the fuel tank 30.

According to the present embodiment, since there is no need to slide the fuel tank 30 forward when installing the fuel tank 30, it is possible to reduce the interval between the fuel tank 30 and the battery 47 located rearward of the fuel tank 30. In the present embodiment, the minimum interval G2 between the fuel tank 30 and the battery 47 in the vehicle front-rear direction is smaller than the dimension T1 of the rubber bracket 32 in the vehicle front-rear direction. According to the present embodiment, it is possible to avoid creating dead space rearward of the fuel tank 30.

According to the present embodiment, the front portion of the fuel tank 30 is supported on the main frames 14L and 14R via the engagement between the protruding members 31 and the rubber brackets 32, and the rear portion of the fuel tank 30 is secured on the rear cross frame 44 of the vehicle body frame 3 via the bolt 46. The entirety of the fuel tank 30 can be supported stably on the vehicle body frame 3 while realizing the advantageous effects set forth above.

While one embodiment of the present invention has been described above, the embodiment described above is merely an example, and the present invention can be carried out in various other embodiments. Next, an example alternative embodiment of the present invention will be described briefly.

Figure 17:
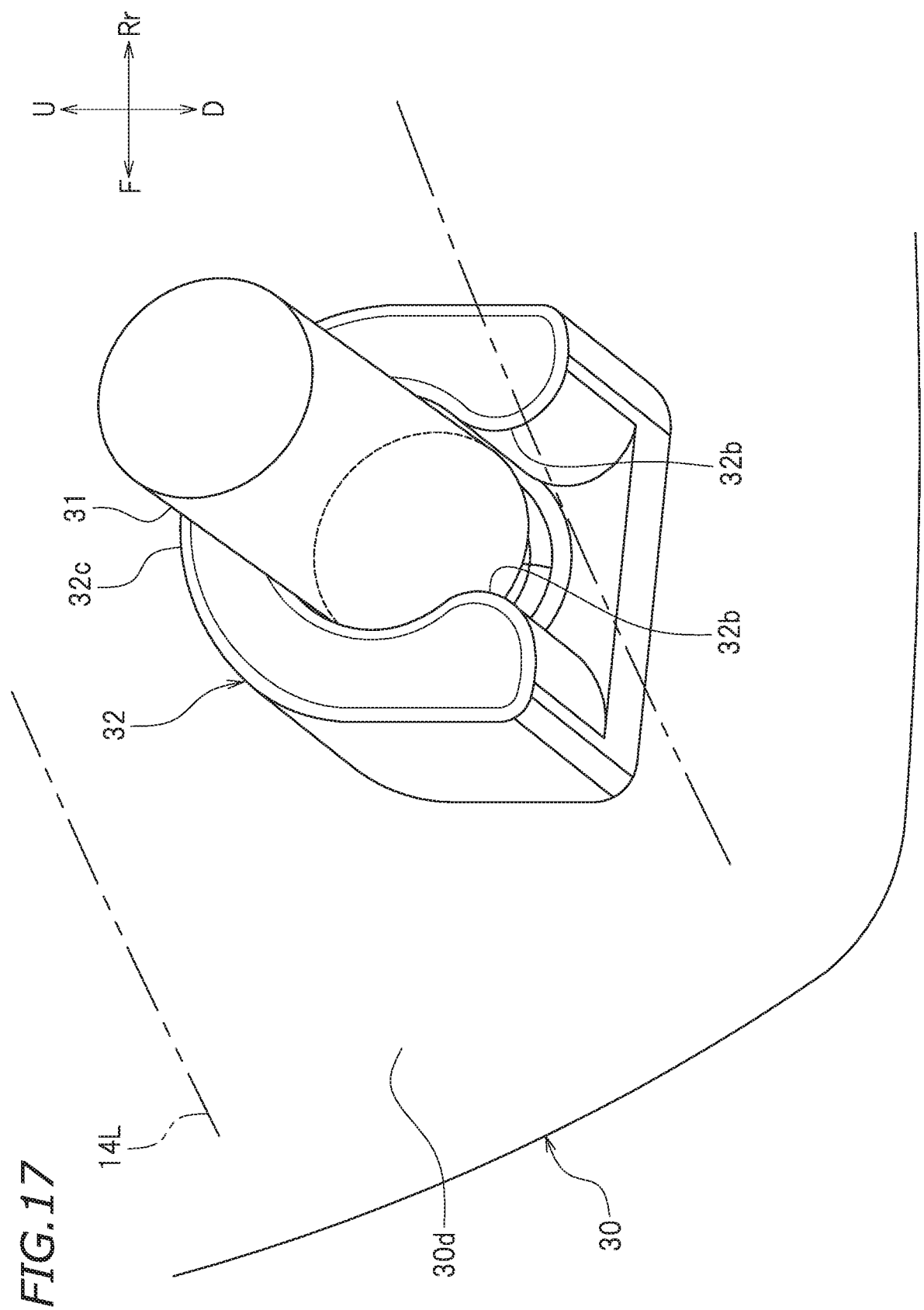
FIG. 17 is a perspective view of a protruding member and a rubber bracket according to another embodiment.

In the embodiment described above, the protruding members 31 are provided on the side walls 30d of the fuel tank 30, and the rubber brackets 32 are secured on the left main frame 14L and the right main frame 14R. Alternatively, as shown in FIG. 17, the protruding member 31 may be provided on the left main frame 14L, and the rubber bracket 32 may be attached to the left side wall 30d of the fuel tank 30. Alternatively, the protruding member 31 may be provided on the right main frame 14R, and the rubber bracket 32 may be attached to the right side wall 30d of the fuel tank 30.

In the embodiment shown in FIG. 17, the rubber bracket 32 attached on the side wall 30d of the fuel tank 30 is shaped into a recessed shape that is open downward. The rubber bracket 32 includes a supported portion 32c that is supported on the protruding member 31, and barb portions 32b located under the supported portion 32c. A pair of, front and rear, barb portions 32b, are provided and located so that the interval therebetween narrows while extending downward. Otherwise, it is similar to that of the embodiment described above. Therefore, the description of other parts will be omitted.

In this embodiment, as the rubber bracket 32 is pressed from above against the protruding member 31, the barb portions 32b widen, allowing the protruding member 31 to be fitted into the rubber bracket 32. Then, the supported portion 32c comes into contact with, and is supported on, the protruding member 31. Since the rubber bracket 32 includes the barb portions 32b, the protruding member 31 is unlikely to come off the rubber bracket 32.

Also in this embodiment, as in the embodiment described above, it is possible to reduce the number of parts and it is easy to install the fuel tank 30. During the installment, there is no need to slide the fuel tank 30 forward or rearward, and there is no need to reserve extra space forward or rearward of the fuel tank 30.

Since the rubber bracket 32 includes the barb portions 32b, it is possible to more reliably prevent the protruding member 31 from coming off the rubber bracket 32. Therefore, the fuel tank 30 can be supported stably on the main frames 14L and 14R.

A motorcycle has been described in the embodiment described above as an example straddled vehicle. However, a straddled vehicle is not limited to a motorcycle. It may be any other straddled vehicle such as a three-wheeled vehicle and an all terrain vehicle (ATV).

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

What is claimed is:

1. A straddled vehicle comprising:
    a vehicle body frame including a head pipe, and a main frame extending rearward from the head pipe in a vehicle front-rear direction;
    a fuel tank including a side wall;
    a rubber bracket attached to the main frame and formed to have sides defining a recess that is open upward;
    a protruding member extending sideways from the side wall of the fuel tank, wherein the protruding member engages with the rubber bracket to be located within the recess; and
    a rear cross frame located rearward of the rubber bracket in the vehicle front-rear direction and extending sideways from the main frame,
    wherein a portion of the fuel tank overlaps with the rear cross frame as the vehicle is viewed from directly above the cross frame.

2. The straddled vehicle according to claim 1, wherein the rubber bracket includes a supporting portion that supports the protruding member, and front and rear barb portions located above the supporting portion and located so that an interval therebetween is narrower than an interval between side walls of the rubber bracket below the front and rear barb portions.

3. The straddled vehicle according to claim 1, wherein the rubber bracket is fastened to the main frame via a bolt.

4. The straddled vehicle according to claim 1, wherein the protruding member is formed integrally with the fuel tank.

5. The straddled vehicle according to claim 1, wherein the protruding member extends outward in a vehicle width direction.

6. The straddled vehicle according to claim 1, wherein the main frame and the rubber bracket overlap with each other as the vehicle is viewed from the side.

7. The straddled vehicle according to claim 1, comprising a seat located over the fuel tank, at least a portion of the seat being supported by the fuel tank.

8. The straddled vehicle according to claim 7, wherein a front end of the seat is located forward of a middle position of the fuel tank in the vehicle front-rear direction.

9. The straddled vehicle according to claim 7, wherein a front end of the seat is located forward of a front end of the fuel tank in the vehicle front-rear direction.

10. The straddled vehicle according to claim 1, comprising a first vehicle part located forward of the fuel tank in the vehicle front-rear direction,
wherein a minimum interval between the fuel tank and the first vehicle part in the vehicle front-rear direction is smaller than a dimension of the rubber bracket in the vehicle front-rear direction.

11. The straddled vehicle according to claim 10, wherein the first vehicle part is an air cleaner.

12. The straddled vehicle according to claim 1, comprising a second vehicle part located rearward of the fuel tank in the vehicle front-rear direction,
wherein a minimum interval between the fuel tank and the second vehicle part in the vehicle front-rear direction is smaller than a dimension of the rubber bracket in the vehicle front-rear direction.

13. The straddled vehicle according to claim 12, wherein the second vehicle part is a battery.

14. The straddled vehicle according to claim 1, wherein:
the protruding member and the rubber bracket are located forward of a middle position of the fuel tank in the vehicle front-rear direction; and
the straddled vehicle comprises a fastened portion provided in a portion of the fuel tank that is rearward of the middle position thereof in the vehicle front-rear direction, wherein the fastened portion is fastened to the vehicle body frame via a bolt.

15. A straddled vehicle comprising:
a vehicle body frame including a head pipe, and a main frame extending rearward from the head pipe in a vehicle front-rear direction;
a fuel tank including a side wall;
a protruding member extending sideways from the main frame;
a rubber bracket attached to the side wall of the fuel tank and formed to have sides defining a recess that is open downward, the rubber bracket being made of rubber, such that a portion of the rubber bracket facing the side wall of the fuel tank is made of rubber and the sides defining the recess that is open downward are made of rubber; and
a rear cross frame located rearward of the protruding member in the vehicle front-rear direction and extending sideways from the main frame,
wherein a portion of the fuel tank overlaps with the rear cross frame as the vehicle is viewed from directly above the rear cross frame.

16. The straddled vehicle according to claim 15, wherein the main frame and the rubber bracket overlap with each other as the vehicle is viewed from the side.

17. The straddled vehicle according to claim 15, comprising a seat located over the fuel tank, at least a portion of the seat being supported by the fuel tank.

18. The straddled vehicle according to claim 17, wherein a front end of the seat is located forward of a middle position of the fuel tank in the vehicle front-rear direction.

19. The straddled vehicle according to claim 17, wherein a front end of the seat is located forward of a front end of the fuel tank in the vehicle front-rear direction.

20. A straddled vehicle comprising:
a vehicle body frame including a head pipe, and a main frame extending rearward from the head pipe in a vehicle front-rear direction;
a fuel tank including a side wall;
a protruding member extending sideways from the main frame;
a rubber bracket attached to the side wall of the fuel tank and formed to have sides defining a recess that is open downward; and
a rear cross frame located rearward of the protruding member in the vehicle front-rear direction and extending sideways from the main frame,
wherein a portion of the fuel tank overlaps with the rear cross frame as the vehicle is viewed from directly above the rear cross frame, and
wherein the rubber bracket includes a supported portion that is supported by the protruding member, and front and rear barb portions located below the supported portion and located so that an interval therebetween is narrower than an interval between side walls of the rubber bracket above the front and rear barb portions.

* * * * *